US011601880B2

(12) United States Patent
Geekie et al.

(10) Patent No.: US 11,601,880 B2
(45) Date of Patent: Mar. 7, 2023

(54) POWER MANAGEMENT FOR A USER EQUIPMENT IN A MULTI-RADIO CONNECTIVITY MODE OR CARRIER AGGREGATION MODE

(71) Applicant: QUALCOMM Incorporated, San Diego, CA (US)

(72) Inventors: James Francis Geekie, Carlsbad, CA (US); Arvind Vardarajan Santhanam, San Diego, CA (US); Mahbod Ghelichi, San Diego, CA (US); Shanshan Wang, San Diego, CA (US); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 16/861,928

(22) Filed: Apr. 29, 2020

(65) Prior Publication Data

US 2020/0351771 A1    Nov. 5, 2020

Related U.S. Application Data

(60) Provisional application No. 62/923,344, filed on Oct. 18, 2019, provisional application No. 62/841,738, filed on May 1, 2019.

(51) Int. Cl.
*H04W 52/02* (2009.01)
*H04W 76/15* (2018.01)
(Continued)

(52) U.S. Cl.
CPC ....... *H04W 52/0212* (2013.01); *H04L 1/0026* (2013.01); *H04W 4/38* (2018.02);
(Continued)

(58) Field of Classification Search
None
See application file for complete search history.

(56) References Cited

U.S. PATENT DOCUMENTS 11,026,141 B2 * 6/2021 Axmon ................. H04W 36/32
2012/0176924 A1 * 7/2012 Wu ..................... H04W 72/082
370/252
(Continued)

FOREIGN PATENT DOCUMENTS

EP    2983393 A1    2/2016
EP    3016449 A1    5/2016
(Continued)

OTHER PUBLICATIONS

International Search Report and Written Opinion—PCT/US2020/030790—Isa/Epo—dated Oct. 6, 2020
(Continued)

*Primary Examiner* — Mariela Vidal Carpio
(74) *Attorney, Agent, or Firm* — Qualcomm Incorporated

(57) ABSTRACT

A UE may, responsive to detecting a power-related condition, send a message to induce the master node to release the secondary node. Such a message can include a message reporting a radio link failure of the secondary node, or, if a channel quality indicator is configured for at least some of the secondary cells of the secondary node, reporting a low CQI value so that the network can cease scheduling on such cells. Alternatively, in a carrier aggregation (CA) mode, with the UE connected to a single node comprising a primary cell and one or more secondary cells, the UE may not control which and how many secondary cells with which it communicates. In such a scenario, if such secondary cells are configured for channel quality indicator reporting, the UE may report a low CQI value so that the node will cease scheduling data on such cells.

29 Claims, 8 Drawing Sheets

(51) Int. Cl.
*H04L 1/00* (2006.01)
*H04W 76/30* (2018.01)
*H04W 4/38* (2018.01)
*H04W 24/10* (2009.01)
*H04W 84/18* (2009.01)

(52) U.S. Cl.
CPC ........... *H04W 24/10* (2013.01); *H04W 76/15* (2018.02); *H04W 76/30* (2018.02); *H04W 84/18* (2013.01)

(56) References Cited

U.S. PATENT DOCUMENTS

| | | | |
|---|---|---|---|
| 2015/0003311 A1* | 1/2015 | Feuersaenger | H04L 27/2602 370/311 |
| 2015/0319778 A1* | 11/2015 | Folke | H04W 72/02 370/330 |
| 2015/0341897 A1* | 11/2015 | Zhu | H04W 68/005 370/329 |
| 2016/0127998 A1* | 5/2016 | Roessel | H04L 5/0096 370/311 |
| 2016/0242191 A1* | 8/2016 | Liao | H04W 24/10 |
| 2016/0262177 A1 | 9/2016 | Chuttani et al. | |
| 2016/0338109 A1* | 11/2016 | Rahman | H04W 56/005 |
| 2017/0034840 A1* | 2/2017 | Mandil | H04W 72/1263 |
| 2020/0022215 A1* | 1/2020 | Takahashi | H04W 76/27 |
| 2020/0137819 A1* | 4/2020 | Shi | H04W 76/19 |
| 2020/0259601 A1* | 8/2020 | Zhou | H04W 76/28 |
| 2021/0227623 A1* | 7/2021 | Park | H04W 52/02 |
| 2021/0242987 A1* | 8/2021 | Kazmi | H04L 5/0048 |
| 2021/0266811 A1* | 8/2021 | Hwang | H04W 36/0058 |
| 2022/0104301 A1* | 3/2022 | Wu | H04W 76/16 |
| 2022/0116874 A1* | 4/2022 | Xu | H04W 28/0278 |
| 2022/0141904 A1* | 5/2022 | Yilmaz | H04L 5/0035 370/329 |
| 2022/0167358 A1* | 5/2022 | Cheng | H04W 72/085 |

FOREIGN PATENT DOCUMENTS

| | | |
|---|---|---|
| EP | 3681197 A1 | 7/2020 |
| KR | 20190010864 A | 1/2019 |

OTHER PUBLICATIONS

Qualcomm Inc: "Ue Assistance Information for Power Saving", 3GPP Draft, 3GPP TSG-RAN WG2 Meeting #105bis, R2-1903053, UE Assistance Information for Power Saving, 3rd Generation Partnership Project (3GPP), Mobile Competence Centre, 650, Route Des Lucioles, F-06921, Sophia-Antipolis Cedex, France, vol. RAN WG2, No. Xi'an, China, Apr. 8, 2019-Apr. 12, 2019, Apr. 6, 2019 (Apr. 6, 2019), XP051700410, 3 pages, Retrieved from the Internet: URL: http://www.3gpp.org/ftp/Meetings%5F3GPP%5FSYNC/RAN2/Docs/R2%2D1903053%2Ezip [retrieved on Apr. 6, 2019] paragraph [0002].

SHARP: "Clarification of UE Behaviours on SCell Deactivation", 3GPP Draft, 3GPP TSG-RAN2 Meeting #73, R2-111277, 3rd Generation Partnership Project (3GPP), Mobile Competence Centre, 650, Route Des Lucioles, F-06921, Sophia-Antipolis Cedex, France, vol. RAN WG2, No. Taipei, Taiwan; Feb. 21, 2011-Feb. 25, 2011, Feb. 15, 2011 (Feb. 15, 2011), XP050493761, 2 pages, [retrieved on Feb. 15, 2011] paragraph [5.13].

* cited by examiner

POWER MANAGEMENT FOR A USER EQUIPMENT IN A MULTI-RADIO CONNECTIVITY MODE OR CARRIER AGGREGATION MODE

RELATED AND CO-PENDING APPLICATIONS

This patent application claims priority to U.S. Provisional Patent Applications 62/841,738, filed May 1, 2019, titled "Power Management for a User Equipment in a Multi-Radio Connectivity Mode," and 62/923,344, filed on Oct. 18, 2019, titled "Power Management for a User Equipment in a Multi-Radio Connectivity Mode or Carrier Aggregation Mode," which are, in their entireties, hereby incorporated by reference.

BACKGROUND

Field

This application relates to power management for a user equipment (UE) in a Multi-Radio Dual Connectivity (MR-DC) scenario, for example, an Evolved Universal Terrestrial Radio Access (E-UTRA)-New Radio (NR) Dual Connectivity (EN-DC) scenario.

Background

As New Radio (NR) networks begin deployment, it is expected that the first wave of networks and devices will be classed as Non-Stand Alone (NSA). NR is often also referred to as 5G. NSA network and devices will be supported by existing E-UTRA, also referred to as LTE or 4G, infrastructure. When operating in an NSA mode, 5G devices can, for example, connect to the NR network for data-throughput improvements and can use LTE for low throughput and/or non-data duties.

It is expected that many applications may migrate eventually to 5G Stand Alone (SA) operation. While SA operation brings improvements of simplification and efficiency when compared to NSA operation, even after SA deployment, many applications may still use NSA. For example, in situations where deployment of a fully NR network is too costly, an NSA modality may remain important even when 5G is mature and SA has been deployed in other environments. As such, even in the long term, improvements to power management in NSA multi-radio connectivity scenarios will continue to be useful.

In NSA MR-DC scenarios, such as EN-DC scenarios, the UE can utilize resources provided by two different nodes to increase time, frequency, and other resources available to the UE for communication. For example, one node can provide NR access and another can provide either E-UTRA or NR access.

SUMMARY

In one aspect, a method for reducing power consumption by a user equipment (UE) can include entering, by the UE, a multi-radio connectivity mode in which the UE is able to receive user data from a master node or a secondary node, where the master node controls a connection of the UE to the secondary node in the multi-radio connectivity mode; detecting, by the UE, a power-related condition of the UE; and sending, responsive at least in part to detecting the power-related condition of the UE, from the UE to the master node, a message to indicate to the master node to release the connection of the UE to the secondary node. The method may further include reducing power to one or more components associated with receiving transmissions from the secondary node. The method may also further include responsive at least in part to detecting the power-related condition of the UE, muting actual measurements of signals associated with the secondary node. The method may also further include detecting that the power-related condition of the UE has been mitigated, and, responsive at least in part to detecting that the power-related condition of the UE has been mitigated, unmuting actual measurements of signals associated with the secondary node. The power-related condition of the UE can include a battery state of charge of a battery of the UE falling below a battery charge threshold, a battery voltage of the battery of the UE falling below a battery voltage threshold, a temperature reading in the UE exceeding a temperature threshold, or any combination thereof.

In another aspect, a user equipment (UE) can include a sensor, a transceiver, a memory, and a processor in communication with the sensor, the transceiver, and the memory. The processor can be configured to enter a multi-radio connectivity mode in which the UE is able to receive user data from a master node or a secondary node, where the master node controls the multi-radio connectivity mode; receive, from the sensor, a signal indicating a power-related condition of the UE; and send, responsive at least in part to receiving the signal indicating the power-related condition of the UE, to the master node via the transceiver, a message to indicate to the master node to release the connection of the UE to the secondary node. In various aspects, the sensor may be a battery charge sensor, a battery voltage sensor, and/or a temperature sensor.

In another aspect, an apparatus for reducing power consumption by a user equipment (UE) can include means for entering a multi-radio connectivity mode in which the UE is able to receive user data from a master node or a secondary node, where the master node controls the multi-radio connectivity mode; means for detecting a power-related condition of the UE; and means for sending, responsive at least in part to detecting the power-related condition of the UE, from the UE to the master node, a message to indicate to the master node to release the connection of the UE to the secondary node. The apparatus may further include means for reducing power to one or more components associated with receiving transmissions from the secondary node. The apparatus may also further include means for, responsive at least in part to detecting the power-related condition of the UE, muting actual measurements of signals associated with the secondary node. The apparatus may also further include means for detecting that the power-related condition of the UE has been mitigated; and means for, responsive at least in part to detecting that the power-related condition of the UE has been mitigated, unmuting actual measurements of signals associated with the secondary node.

In another aspect, a non-transitory computer-readable medium stores code for reducing power consumption by a user equipment (UE). The code comprises instructions executable by one or more processors of the UE. The instructions can instruct the one or more processors to enter a multi-radio connectivity mode in which the UE is able to receive user data from a master node or a secondary node, wherein the master node controls the multi-radio connectivity mode; detect a power-related condition of the UE; and send, responsive at least in part to detecting the power-related condition of the UE, from the UE to the master node, a message to indicate to the master node to release the connection of the UE to the secondary node.

In another aspect, a method for reducing power consumption by a user equipment (UE) can include entering, by the UE, a multi-radio connectivity mode in which the UE is able to receive user data from a master node or a secondary node, wherein the master node controls a connection of the UE to the secondary node in the multi-radio connectivity mode and the secondary node comprises one or more secondary cells; detecting, by the UE, a power-related condition of the UE; and sending a message responsive at least in part to detecting the power-related condition of the UE. The UE can send to the master node, a message to indicate to the master node to release the connection of the UE to the secondary node, or the UE can send to the secondary node, a message to indicate to the secondary node to stop scheduling on at least one of the secondary cells configured on the secondary node. The method may further include determining, by the UE, whether each of the one or more secondary cells configured on the secondary node is a channel quality indicator (CQI)-configured secondary cell for which CQI is configured. In some implementations, the sending the message to indicate to the secondary node to stop scheduling on at least one of the secondary cells configured on the secondary node comprises reporting a CQI value of zero (0) at least once for at least some CQI-configured secondary cells.

In another aspect, a user equipment (UE) can include a sensor, a transceiver, a memory, and a processor in communication with the sensor, the transceiver, and the memory. The processor can be configured to enter a multi-radio connectivity mode in which the UE is able to receive user data from a master node or a secondary node, where the master node controls the multi-radio connectivity mode and the secondary node comprises one or more secondary cells; receive, from the sensor, a signal indicating a power-related condition of the UE; and send, responsive at least in part to receiving the signal indicating the power-related condition of the UE, to the master node via the transceiver, a message to indicate to the master node to release the connection of the UE to the secondary node, or to the secondary node via the transceiver, a message to indicate to the secondary node to stop scheduling on at least one of the secondary cells configured on the secondary node.

In another aspect, an apparatus for reducing power consumption by a user equipment (UE) can include means for entering a multi-radio connectivity mode in which the UE is able to receive user data from a master node or a secondary node, where the master node controls the multi-radio connectivity mode and the secondary node comprises one or more secondary cells; means for detecting a power-related condition of the UE; and means for sending, responsive at least in part to detecting the power-related condition of the UE, from the UE to the master node, a message to indicate to the master node to release the connection of the UE to the secondary node, or from the UE to the secondary node, a message to indicate to the secondary node to stop scheduling on at least one of the secondary cells configured on the secondary node.

In another aspect, a non-transitory computer-readable medium stores code for reducing power consumption by a user equipment (UE). The code comprises instructions executable by one or more processors of the UE. The instructions can instruct the one or more processors to enter a multi-radio connectivity mode in which the UE is able to receive user data from a master node or a secondary node, wherein the master node controls the multi-radio connectivity mode and the secondary node comprises one or more secondary cells; detect a power-related condition of the UE; and send, responsive at least in part to detecting the power-related condition of the UE, from the UE to the master node, a message to indicate to the master node to release the connection of the UE to the secondary node, or from the UE to the secondary node, a message to indicate to the secondary node to stop scheduling on at least one of the secondary cells configured on the secondary node.

In another aspect, a method for reducing power consumption by a user equipment (UE) can include entering, by the UE, a carrier aggregation mode in which the UE is able to receive data from a node comprising a primary cell and one or more secondary cells; detecting, by the UE, a power-related condition of the UE; determining, by the UE, whether each of the one or more secondary cells is a channel quality indicator (CQI)-configured secondary cell for which CQI is configured; sending, responsive at least in part to detecting the power-related condition of the UE and based on a determination that at least one secondary cell configured on the node is a CQI-configured secondary cell, to the node a message to indicate to the node to stop scheduling on the at least one of the secondary cells; and ceasing, responsive at least in part to detecting the power-related condition of the UE and based on a determination that none of the secondary cells in the node is a CQI-configured secondary cell, communications with the network.

In another aspect, a user equipment (UE) includes, a sensor, a transceiver, a memory, and a processor in communication with the sensor, the transceiver, and the memory. The processor can be configured to enter a carrier aggregation mode in which the UE is able to receive data from a node comprising a primary cell and one or more secondary cells; receive, from the sensor, a signal indicating a power-related condition of the UE; determine whether each of the one or more secondary cells is a channel quality indicator (CQI)-configured secondary cell for which CQI is configured; send, via the transceiver, responsive at least in part to receiving the signal indicating the power-related condition of the UE and based on a determination that at least one secondary cell configured on the node is a CQI-configured secondary cell, to the node, via the transceiver, a message to indicate to the node to stop scheduling on the at least one of the secondary cells; and cease, responsive at least in part to receiving the signal indicating the power-related condition of the UE and based on a determination that none of the secondary cells in the node is a CQI-configured secondary cell, communications with the network.

In another aspect, an apparatus for reducing power consumption by a user equipment (UE) can include means for entering, by the UE, a carrier aggregation mode in which the UE is able to receive data from a node comprising a primary cell and one or more secondary cells; means for detecting, by the UE, a power-related condition of the UE; determining, by the UE, whether each of the one or more secondary cells is a channel quality indicator (CQI)-configured secondary cell for which CQI is configured; means for sending, responsive at least in part to detecting the power-related condition of the UE and based on a determination that at least one secondary cell configured on the node is a CQI-configured secondary cell, to the node a message to indicate to the node to stop scheduling on the at least one of the secondary cells; and means for ceasing, responsive at least in part to detecting the power-related condition of the UE and based on a determination that none of the secondary cells in the node is a CQI-configured secondary cell, communications with the network.

In another aspect, a non-transitory computer-readable medium stores code for reducing power consumption by a user equipment (UE). The code comprises instructions executable by one or more processors of the UE. The instructions can instruct the one or more processors to enter, by the UE, a carrier aggregation mode in which the UE is able to receive data from a node comprising a primary cell and one or more secondary cells; detect, by the UE, a power-related condition of the UE; determine, by the UE, whether each of the one or more secondary cells is a channel quality indicator (CQI)-configured secondary cell for which CQI is configured; send, responsive at least in part to detecting the power-related condition of the UE and based on a determination that at least one secondary cell configured on the node is a CQI-configured secondary cell, to the node a message to indicate to the node to stop scheduling on the at least one of the secondary cells; and cease, responsive at least in part to detecting the power-related condition of the UE and based on a determination that none of the secondary cells in the node is a CQI-configured secondary cell, communications with the network.

DETAILED DESCRIPTION

Figure 1A:
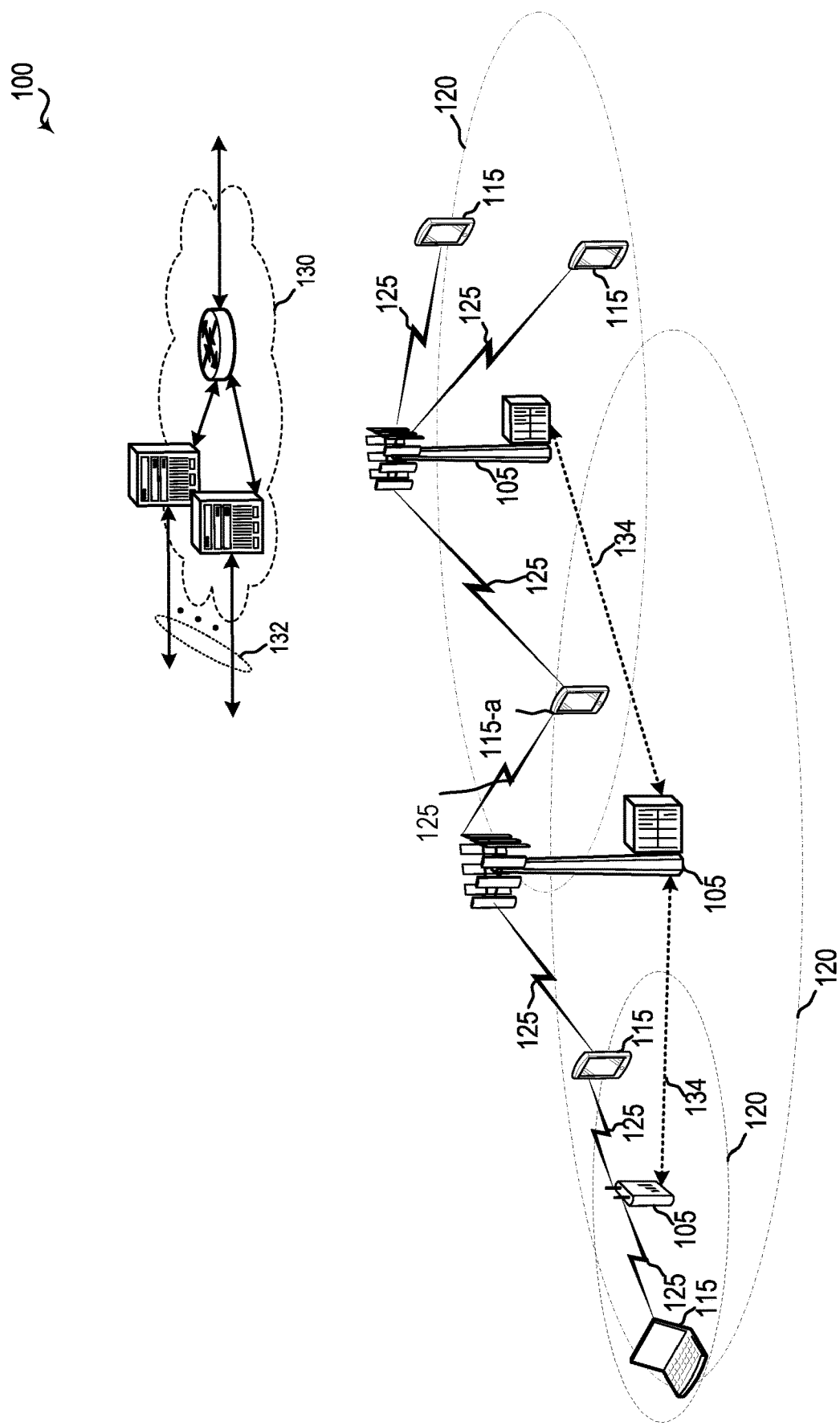
FIGS. 1A and 1B illustrate an example of wireless communications systems in accordance with various aspects of the present disclosure.
Figure 1B:
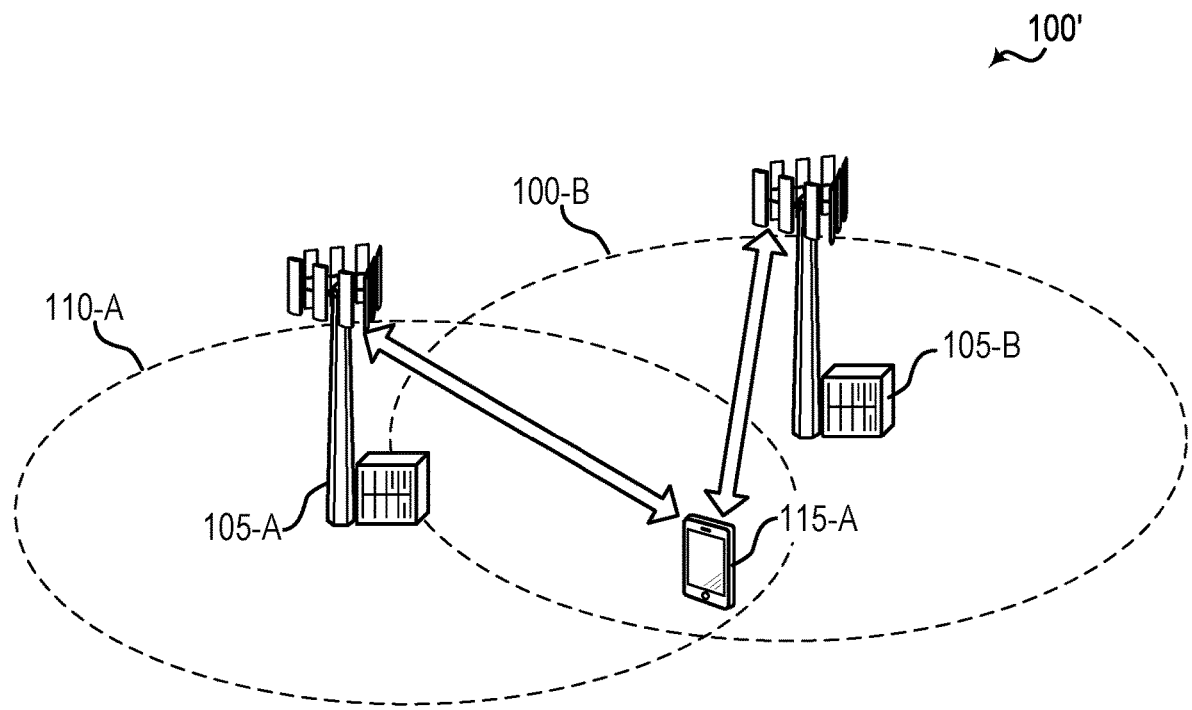

FIGS. 1A and 1B illustrate an example of a wireless communications systems that supports power savings in a multi-connectivity UE in accordance with various aspects of the present disclosure. With reference to FIG. 1A. The wireless communications system 100 includes base stations 105, UEs 115, and a core network 130. In some examples, the wireless communications system 100 may be a Long Term Evolution (LTE) network, an LTE-Advanced (LTE-A) network, a New Radio (NR) network, or a combination thereof. Wireless communication system 100 may support power savings in a multi-connectivity UE by configuring the UE to disable the functionality associated with one of two or more nodes to which the UE can be connected in one or more scenarios. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 120 in which communications with various UEs 115 is supported. Each base station 105 may provide communication coverage for a respective geographic coverage area 120 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 120 for a base station 105 may be divided into sectors making up only a portion of the geographic coverage area 120, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 120. In some examples, different geographic coverage areas 120 associated with different technologies may overlap and overlapping geographic coverage areas 120 associated with different technologies may be supported by the same base station 105 or by different base stations 105. For example, the same base station 105 or different base stations 105 may be configured to communicate using multiple radio access technologies (RATs), such as 5G NR and 4G LTE, simultaneously, and the coverage areas 120 associated with the multiple RATs may overlap completely or partly. The wireless communications system 100 may include, for example, a heterogeneous LTE/LTE-A or NR network in which different types of base stations 105 provide coverage for various geographic coverage areas 120.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 120 (e.g., a sector) over which the logical entity operates. Furthermore, a single physical base station 105 may be associated with more than one cell. For example, one cell can be associated with a master node (and can be referred to as a PCell) where another cell is associated with a secondary node (and can be referred to as a PSCell). In some implementations, both the PCell and the PSCell can have equipment installed on the same base station 105. In one example, the PCell can be an LTE cell and the PSCell can be an NR cell associated with the same base station 105. In another example, the PCell can be an NR cell operating in a first frequency range and the PSCell can also be an NR cell but operating in a second frequency range different than the first frequency range, and both cells can be associated with the same base station 105.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). Additionally or alternatively, a UE may employ power management techniques as described herein with reference to FIGS. 2A, 2B, 3, and 4. In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 120 of a base station 105. Other UEs 115 in such a group may be outside the geographic coverage area 120 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with component carriers (CCs) operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (Tf=307200*Ts). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols and in some instances, a symbol of a mini-slot or a mini-slot may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple subcarriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

UEs 115 may be configured as multi-connectivity UEs in which UEs 115 are configured to communicate with one or more base stations 105 using multiple RATs (e.g., 5G NR, 4G LTE). UEs 115 may be configured to monitor the behavior and/or habits of a user in using different applications and in utilizing different throughputs associated with the RATs. UEs 115 may also be configured to adjust their power consumption based on the monitored behavior and/or habits. UEs 115 may adjust their power consumption by disabling one or more of its RATs. UEs 115 may determine to adjust their power consumption based on various factors as described in more detail below.

With reference to FIG. 1B, communications system 100' may implement aspects of wireless communications system 100. For example, wireless communications system 100' includes a first base station 105-a, a second base station 105-b, and a UE 115-a, which may be examples of the corresponding devices described with reference to FIG. 1A. Wireless communications system 100' may support the use of techniques that enhance power savings in a multi-connectivity UE based on one or more various factors.

In wireless communications system 100', a UE 115-a may communicate with a network using a multi-connectivity, for example, dual-connectivity (DC) configuration. In such cases, UE 115-a may simultaneously communicate with different base stations 105 (e.g., first base station 105-a and second base station 105-b). First base station 105-a may provide a first cell 110-a and first base station 105-a may be referred to as a master node (MN). First cell 110-a may correspond to a PCell in the DC deployment. Additionally, second base station 105-b may provide a second cell 110-b of the DC configuration, and second base station 105-b may be referred to as a secondary node (SN). In some cases, second cell 110-b may correspond to a PSCell in the DC deployment, which may be configured with time-frequency resources for PUCCH. Additional SCells may be associated with each base station 105-a and 105-b. A master cell group (MCG) may then refer to a group of serving cells associated with the MN, comprising the PCell and optionally one or more SCells, and a secondary cell group (SCG) may then refer to a group of serving cells associated with the SN, comprising the PSCell and optionally one or more SCells. In some implementations, the SCells can provide additional carriers in addition to carriers of the PCell or PSCell for carrier aggregation. In a multi-connectivity implementation, such as dual-connectivity, while the transfer of data is split between the MN and the SN, control of multi-connectivity remains with the MN. For example, all RRC configurations related to the SN are sent by the MN, as illustrated, for example, by 209, 212, 242, and 245 with reference to FIG. 2A. Other non-scheduling related control information related to the SN can also be routed through the MN, while scheduling for the SN can be handled by the SN through the SN's own physical downlink control channel (PDCCH). Although shown as two different base stations 105-a and 105-b for purposes of illustration, it is understood that in some implementations, the PCell of the MN and the PSCell of the SN may be separate cells that are installed on the same physical base station.

The MN (e.g., 105-a) can instruct the UE (e.g., 115-a) to make measurements of signals associated with the SN (e.g., 105-b) and to report the measurements to MN. If the reported signal measurements suggest that a good communication link between the UE and the SN can be established, the MN provides the UE and the SN with all the parameters for them to establish a connection. The MN can be configured to control whether the SN is added or not, while the UE cannot make this determination. As such, if it is useful for the UE to end a multi-connectivity mode to conserve power, the UE may not be able to instruct the SN to release the connection but must rather send a message to the MN to induce the MN to instruct the SN to release the connection. In order not to require additional changes to the standard, the UE may send a message to the MN to induce the MN to instruct the SN to release the connection using one or more messages already defined in a communications standard.

In some cases, the different base stations 105 and corresponding cells of the DC deployment may be associated with a same or different RAT. For instance, first base station 105-a and second base station 105-b may communicate using a first RAT and a second RAT, respectively. The first RAT and/or the second RAT may be the same or different and may include, for example, LTE, NR, or another RAT. As such, various DC deployments may sometimes be referred to as EN-DC, NR-EUTRA DC (NE-DC), NR NR-DC, LTE LTE-DC, enhanced LTE (eLTE) eLTE-DC, or may include other types of MR-DC deployments based on the RAT that is used by each base station 105. In any case, the different cells of a DC deployment may use the same or different radio frequency (RF) spectrum bands for communication with UE 115-a.

In some cases, DC deployments may use different radio bearers for transmitted messages for each cell. For instance, when first base station 105-a is configured as a master node that provides a set of serving cells corresponding to the MCG, first base station 105-a may use a first set of signaling radio bearers (SRBs) (e.g., SRB1, SRB2) to transport messages for the MCG, such as RRC messages. Additionally, when second base station 105-b is configured as a secondary node, second base station 105-b may provide another set of serving cells that correspond to the SCG and may use a second set of SRBs (e.g., SRB3) to transport messages for the SCG. In some examples, a split bearer configuration may be supported, where a particular protocol layer (e.g., a packet data convergence protocol (PDCP) layer) for both the master node and secondary node may be used to route data streams to/from UE 115-a. Here, an SRB (e.g., SRB1/SRB2) may be split between the master node and the secondary node, and downlink messages sent from the master node to UE 115-a may be routed via lower-layers (e.g., radio link control (RLC), medium access control (MAC), physical (PHY), etc.) of either first base station 105-a (e.g., the master node) or second base station 105-b (e.g., the secondary node). In other cases, downlink messages may be routed via the lower-layers of both the master and secondary nodes. In the uplink, RRC messages from UE 115-a may be transmitted to the master node via the secondary node using the split bearer (e.g., via a "leg" associated with the secondary node). For the signaling of data in the user plane, respective data radio bearers (DRBs) may be used by the MCG and SCG. It is understood that, in general, the secondary node comprises one or more secondary cells.

Additionally or alternatively, UE 115-a may communicate with a single base station 105 (e.g., first base station 105-a) using multiple carriers (e.g., CCs, which may also be referred to as layers, channels, etc.). In such cases, a CC may refer to each of the carriers used by UE 115-a in carrier aggregation (CA) operations. Further, a serving cell of first base station 105-a may correspond to each CC used in CA operation, where each serving cell may be different (e.g., based on the path loss experienced by different CCs on different RF spectrum bands). In some examples, one carrier may be designated as a primary carrier, or primary CC (PCC), for UE 115-a, which may be served by a PCell of first base station 105-a. Additional carriers may be designated as secondary carriers, or secondary CCs (SCCs), which may be served by SCells of first base station 105-a. CA operations may use the same or different RF bands for communications.

In multi-radio connectivity scenarios, such as dual connectivity scenarios, the simultaneous communication by the UE with the MN and the SN can result in increased power consumption by the UE. For example, the additional connection to the SN can entail monitoring and measuring additional signals, for example reference signals, associated with the SN for reporting to the MN, and this monitoring, measuring, and reporting increases the power consumed by the UE. Additionally, the frequency band and/or RAT associated with the SN may use a larger number of antennas for transmission and/or reception, or an antenna array with a larger number of elements, as compared to the frequency band and/or RAT associated with the MN, and hence the additional connection to the SN can be more power consuming than connecting to the MN only. Furthermore, in situations where the frequency band used by the SN results in a larger bandwidth for data transmission, this larger bandwidth typically results in greater power consumption on the UE to process the data received from the SN. Additionally or alternatively, in some implementations, simultaneous connection to both the MN and the SN can entail the powering on of more hardware elements and/or greater processing burden for simultaneously handling the two connections which increases the power consumption of the UE compared to a connection to the MN alone. In view of some or all of the above, power management of multi-connectivity, such as dual-connectivity, can extend the time a UE can be used before requiring a recharge of a battery.

Figure 2A:
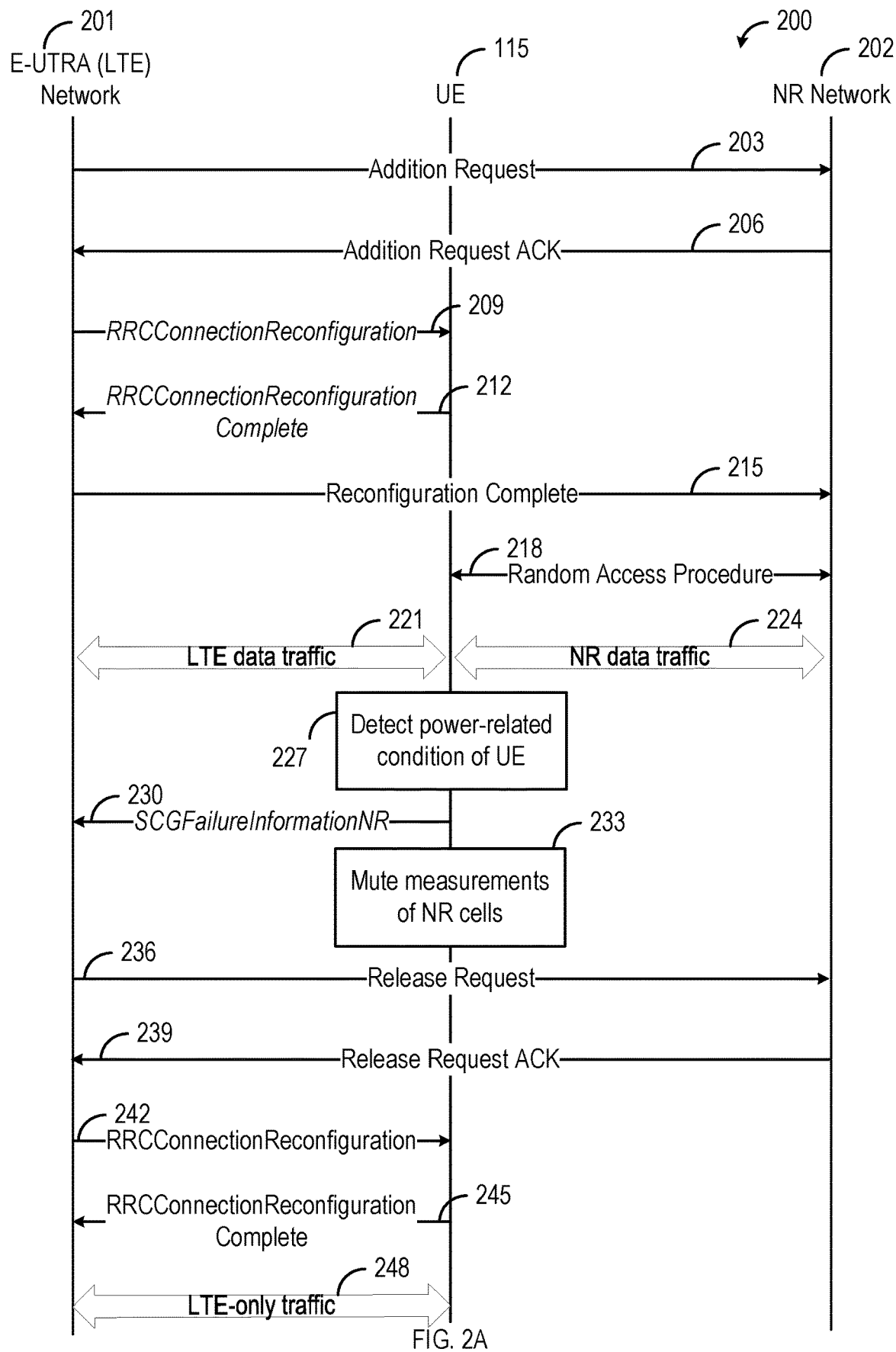
FIGS. 2A and 2B illustrate a sample flow diagram in which a user equipment (UE) is already connected in an Evolved Universal Terrestrial Radio Access (E-UTRA)-New Radio (NR) Dual Connectivity (EN-DC) mode and detects a power related-condition while in the EN-DC mode.
Figure 2B:
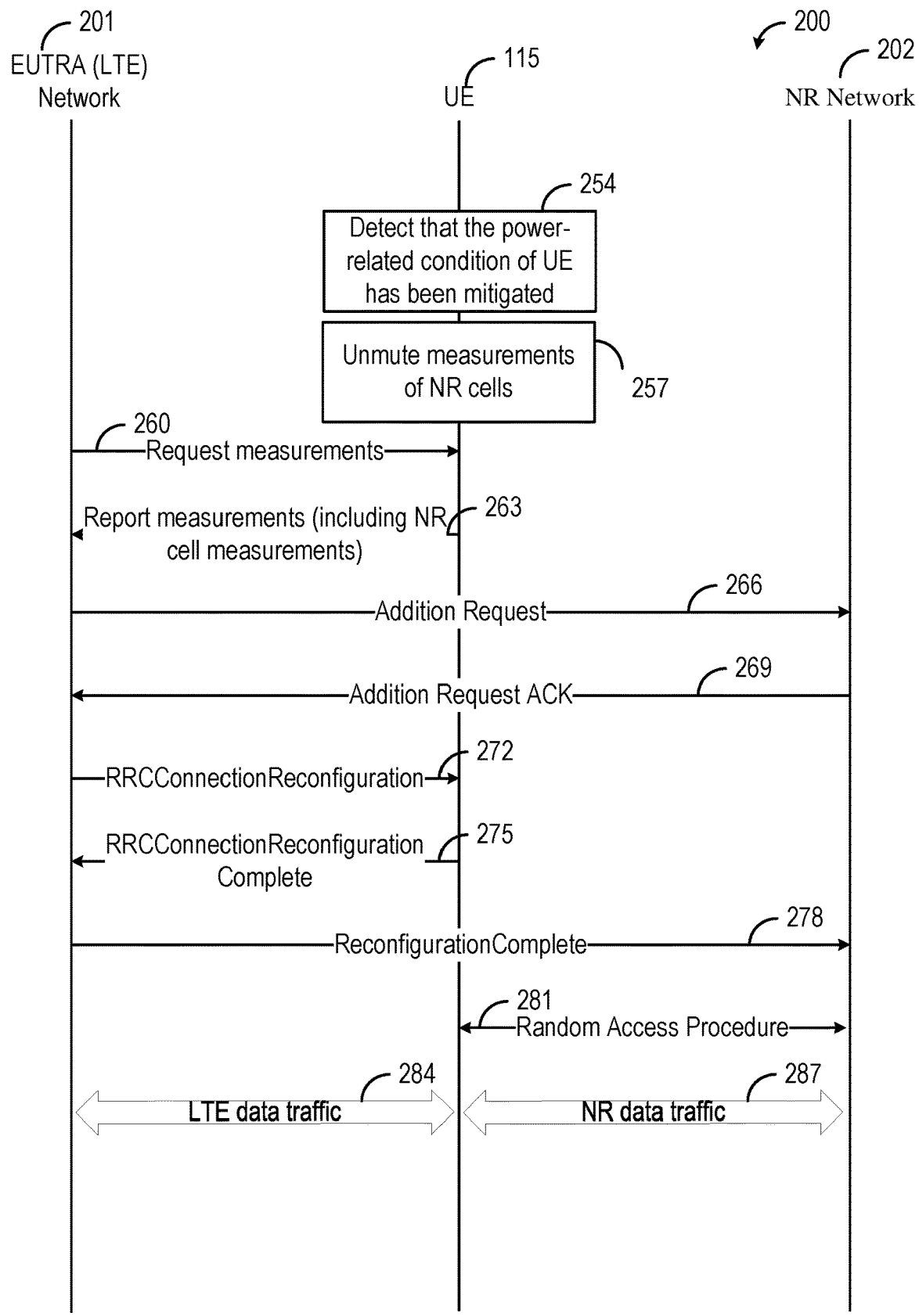

FIGS. 2A and 2B illustrate a sample flow 200 in which a user equipment (UE) is already connected in an Evolved Universal Terrestrial Radio Access (E-UTRA)-New Radio (NR) Dual Connectivity (EN-DC) mode and detects a power related-condition while in the EN-DC mode. It is understood that the sample flow 200 provided is for illustrative purposes, and is merely one example of a scenario where a UE 115 can enter a multi-radio connectivity mode, e.g., a dual connectivity mode, detect a power-related condition of the UE 115, and send, responsive to detecting the power-related condition of the UE 115, a message to indicate to the master node to release the connection of the UE to the secondary node. In the particular example provided here, the master node and the secondary node are each associated with different RATs. In this example, the master node is associated with an E-UTRA network or LTE network 201, while the secondary node is associated with an NR network 202.

Although not explicitly illustrated in flow 200, it is understood that certain messages, communications, or processes may have occurred prior to 203. For example, a random access procedure or random access control channel (RACH) procedure may have occurred for the UE 115 to gain access to and/or be connected to the LTE network 201, for example, through a special cell (SpCell) of the LTE Network 201. In addition, after connection is established, the LTE network 201 and the UE may have exchanged data, including downlink (DL) and/or uplink (UL) data. Such data can include control data or configuration data. In one example, the LTE network 201 could have sent the UE 115 a radio resource control (RRC) configuration. Often, RRC configurations include information or instructions for the UE 115 to perform measurements on various signals in the UE's 115 environment. In the context of the specific example of flow 200, such an RRC configuration can include information or instructions for the UE 115 to perform measurements on reference signals being transmitted by cells or nodes associated with the LTE network as well as to perform measurements on reference signals being transmitted by cells associated or nodes associated with the NR network. In one example, such reference signals can include channel state information (CSI) reference signals (CSI-RS). In NSA EN-DC type scenarios, initial network access may be to the LTE network. Further, the LTE network may control if and when the UE will connect to the NR network. As such, reference signal measurements from cells in the NR network can be used by the LTE network to determine when NR signals as measured by the UE 115 are strong enough in order to initiate an addition of an NR node, base station, or gNodeB (gNB), and to enter the UE 115 into an EN-DC mode. In such scenarios, the LTE node, base station, or eNodeB (eNB), can be considered a master node (MN) while the NR node can be considered a secondary node (SN). The MN generally provides control plane connection to the core network, while the secondary node provides no control plane connection to the core network and is used to provide additional resources/capabilities to the UE 115. In the flow 200, the LTE node (master node) and the NR node (secondary node) are referred to more generically as LTE Network 201 and NR Network 202. Although the illustrated example shows the MN as an LTE node and the SN as an NR node, in some scenarios, it is understood that the MN and the SN may both be NR nodes. Furthermore, where the MN and SN each use a different RAT for communication with the UE, it is understood that combinations other than LTE and NR are possible.

At 203, the LTE Network 201 can send an addition request to the NR Network 202. In one example, the addition request can be an SgNB Addition Request message. The LTE Network 201, for example, can determine that the UE 115 is in a good signaling environment for NR signals based on measurements by the UE 115 of reference signals measured, for example, as discussed above, based on an RRC configuration sent to the UE 115 from the LTE Network 201. The addition request can serve as a resource request, in which the LTE Network 201 requests the NR Network 202 to allocate resources for the UE 115. As such, the addition request, may include information to enable the NR Network 202 to determine whether it can accommodate the resource allocation request, for example, reference signal measurements of NR signals reported by the UE 115 to the LTE Network 201 as well as other information useful to the NR Network 202 to determine whether it can accept the request.

At 206, if the NR Network 202 is able to admit the resource request, it can respond to the addition request message with an acknowledge message, for example, an SgNB Addition Request Acknowledge message. The NR Network 202 can decide the PSCell and other SCG SCells and, for example, provide a new SCG radio resource configuration to the LTE Network 201 in an NR RRC configuration message, which can be contained in some embodiments, in the SgNB Addition Request Acknowledge message.

At 209, the LTE Network 201 can send to the UE 115 an RRCConnectionReconfiguration message which can, for example, include the NR RRC configuration message received from the NR Network 202. The UE 115 can then apply the new configuration and, at 212, reply to the LTE Network 201 with a RRCConnectionReconfigurationComplete message. If, for some reason, the UE 115 is unable to comply with the configuration included in the RRCConnectionReconfiguration message, it can perform a reconfiguration failure procedure (not shown at 212). In one example, performing the reconfiguration failure procedure can include the UE 115 sending a SCGFailureInformationNR message to the LTE Network 201 (not shown at 212) and setting a failure type in the message to correspond to a failure type associated with RRC reconfiguration failure, such as, for example, scg-reconfigFailure. In one implementation, when there is an RRC reconfiguration failure, the UE 115 does not apply any part of the reconfiguration and continues using the configuration it was using prior to the RRCConnectionReconfiguration message of 209.

At 215 the LTE Network 201 can send a reconfiguration complete message to the NR Network 202 to inform the NR Network 202 that the reconfiguration of the UE 115 was successful. In one example, such a message can be a SgNB ReconfigurationComplete message. This reconfiguration complete message can include, for example, any information provided to the LTE Network 201 from the UE 115, for example, in the RRCConnectionReconfigurationComplete message of 212.

At 218, the UE 115 performs the random access (RA) procedure with the NR Network 202. In one example, the UE can perform the RA procedure through a SpCell of the SN (also referred to as a PSCell). Once the RA procedure is complete, the UE 115 is connected to the NR Network 202. In this example, the UE 115 is now connected to both the LTE Network 201 and the NR Network 202. However, it is understood that other MR-DC scenarios can include simultaneous connection to two NR nodes.

At 221, the UE 115 can communicate with the LTE Network 201. Simultaneously, at 224, the UE 115 can also communicate with the NR Network 202. Since, typically, the SN has greater data throughput capacity, data communications between the UE 115 and the NR Network 202 at 224 can include data associated with high throughput, real time applications such as video streaming or virtual/augmented reality, to name a few examples. Otherwise, low throughput applications can, for example, be routed through the LTE Network 201 as shown in 221. In one implementation, only the MN provides control plane connection to the core network which, in the illustrated embodiment is the LTE MN of the LTE Network 201. Since the UE 115 is now in an EN-DC mode, UE 115 is connected to both LTE Network 201 and NR Network 202 in a dual connection mode. In one example scenario of a dual connection mode, the UE 115 can send and receive control and user data with the LTE Network 201 (including non-scheduling control data related to the NR Network 202), but only sends and receives user data (along with scheduling related to the user data) to/from the NR Network 202.

At 227, the UE detects a power-related condition of the UE 115. As will be explained elsewhere herein, the power-related condition of the UE 115 can include a battery state of charge of a battery of the UE 115 falling below a battery charge threshold, a temperature reading in the UE 115 exceeding a temperature threshold, a battery voltage of the battery of the UE 115 falling below a battery voltage threshold, and/or the like, or any combination thereof. More generally, the power-related condition of the UE 115 can include any condition that can be mitigated by reducing the power consumed by the UE 115, for example, consumed by one or more components of the UE 115. Since the UE is in an EN-DC mode, the UE 115 may then seek to disconnect from the additional network. In this NSA example, the data traffic with the NR Network 202 is additional or optional as the UE 115 can maintain connectivity to the LTE Network 201, and as such, the UE 115 can seek to disconnect from the NR Network 202. However, in a NSA EN-DC scenario, the LTE Network 201 controls if and when the UE will connect to the NR Network 202. As such, using the communications protocols available to the UE 115, the UE 115 can send a message to the LTE Network 201 to indicate to the LTE Network 201 to release the connection of the UE to the NR Network 202 in order for the UE 115 to conserve power. In a scenario where the UE 115 is in a dual connectivity mode with two NR nodes, it is possible for the UE 115 to send such a message to the NR MN to disconnect from the NR SN, for example.

At 230, the UE 115 sends a message to the LTE Network 201 to indicate to the LTE Network 201 to release the connection of the UE to the NR Network 202. Using the protocols defined by standards, for example standards defined by "3rd Generation Partnership Project" (3GPP) including, for example, Technical Specification (TS) 36.331, 37.340, 38.331, and other related standards, the UE 115 may, for example, send an RRC message. For example, the UE 115 may send a SCGFailureInformationNR message to indicate to the LTE Network 201 that the UE 115 has detected a failure in receiving NR signals from the NR Network 202. Although the signal quality of the NR signals may not be failing, the UE 115 may still signal such a failure in order to cause the LTE Network 201 to release the connection between the UE 115 and the NR Network. The failure message may include a failure type. In one example, the failure type can be set to indicate a synchronization reconfiguration failure, SynchReconfigFailure (for example, scg-ChangeFailure or to synchronousReconfigurationFailure-SCG, or the like). Although illustrated in FIG. 2A as a SCGFailureInformationNR message, it is understood that any message that the UE 115 can send to the LTE Network 201 (or, more generally, to the MN) to cause the LTE Network 201 (or, more generally, the MN) to release the connection between the UE 115 and the NR Network (or, more generally, the SN), as defined by a communications standard, may be used.

With continued reference to 230, the SCGFailureInformationNR message can optionally include fields or information elements (IEs) for the UE 115 to report NR signal measurements in accordance with a previous RRC configuration provided to the UE 115 by the LTE Network 201 (prior to 203) as discussed above and/or in accordance with the RRC reconfiguration message of 209 discussed above. In one example, such measurements can be included in a MeasResultSCG-Failure field, a measResultFreqListNR field, and/or the like, or any combination thereof. In one example, the UE 115 may send the SCGFailureInformationNR message without including such a signal measurements field. Alternatively, where the UE 115 reports a failure of the NR connection for the purposes of causing the LTE Network 201 to release the connection for power-related purposes—rather than due to a genuine signal integrity, signal quality, and/or reference signal measurement-based reason for releasing the connection—the UE 115 may report artificial NR reference signal measurements (i.e., the UE may send data for the measurements generated by the UE not based on actual measurements) to the LTE Network 201 within, or subsequent to, the SCGFailureInformationNR message.

At 233, the UE 115 may mute (actual) measurements of NR cells by ceasing to report such measurements to the LTE Network 201. If useful to respond to the LTE Network 201, the UE 115 may report artificial measurements based on data generated not based on actual measurements. Instead of being based on actual measurements, the artificial measurements can represent measurements simulating a bad signaling environment for signals of the NR cell. It is understood that when muting the reporting of measurements of NR cells or signals to the LTE Network, since such measurements are no longer being reported, naturally, UE 115 can cease to measure the signals. By ceasing to measure and muting the measurements of any reference or other signals from NR cells associated with the NR Network 202, the UE 115 can conserve power (in addition to power saved by no longer communicating with the NR Network 202). Although flow 200 illustrates the sending of the message to the LTE Network 201 to indicate to the LTE Network 201 to release the connection of the UE to the NR Network 202 at 230 as occurring before the muting of the measurements of NR cells at 233, it is understood that the muting of the measurements of NR cells may occur before the failure message at 230 is sent.

At 236, responsive to receiving the failure message of 230, the LTE Network 201 may send a release request, for example, a SgNB Release Request message, to the NR Network 202. At 239, the NR Network 202 can send an acknowledgement if it determines that it will release the UE 115.

At 242, the LTE Network 201 can send a new RRC reconfiguration message, for example, an RRCConnectionReconfiguration message. In some examples, the message can instruct the UE 115 to release the configuration associated with the NR Network 202. At 245, the UE 115 can respond with, for example, an RRCConnectionReconfigurationComplete message.

At 248, the UE 115 communicates with the LTE Network 201 only and does not maintain a connection with the NR Network.

Flow 200 continues in FIG. 2B. At 254, the UE 115 can detect that the power-related condition of the UE 115 has been mitigated. For example, the battery state of charge of the battery of the UE 115 may now exceed the battery charge threshold (due to the UE 115 having been charged), the temperature reading in the UE 115 may fall below the temperature threshold (due to the UE 115 cooling down after power was reduced by disconnecting from the NR Network 202), the battery voltage of the battery of the UE 115 may now exceed the battery voltage threshold (due to the UE 115 having been charged), and/or the like, or any combination thereof.

At 257, the UE 115 unmutes measurements of NR cells, and as such, the UE 115 may begin reporting measurements of signals associated with the NR Network 202. Such measurements can be in accordance with an RRC configuration received before 203 and/or any subsequent RRC configuration and/or reconfiguration message received. Although the UE 115 may be configured based on such an RRC configuration to measure NR reference signals from NR cells in the NR Network 202, before unmuting the measurements at 257, the UE 115 may either not report such signal measurements or may report such signal measurements using artificial measurements, for example, data generated by the UE 115 not based on actual signal measurements. However, at 257, where the UE 115 unmutes the measurements, the UE 115 may, responsive to detecting that the power-related condition of the UE 115 has been mitigated, begin measuring and reporting signals received from NR cells.

At 260, optionally, the LTE Network 201 may request measurements from the UE 115. As noted, the LTE Network 201, in some implementations, may not need to explicitly request the measurements at 260 due to an explicit or implicit instruction from a prior RRC configuration or reconfiguration to the UE 115 to provide measurements to the LTE Network 201.

At 263, the UE 115 can provide measurements to the LTE Network 201. The measurements can be provided either in response to an explicit request, as at 260, or due to a prior RRC configuration or reconfiguration. When the LTE Network 201 receives the measurements, including NR cell measurements, the LTE Network 201 can determine, for example, whether the NR signals measured by the UE 115 meet criteria for the UE 115 to be able to connect to the NR Network 202 and/or whether additional resources of the NR Network 202 may be useful in communicating data with the UE 115. Responsive to such a determination, the LTE Network 201 can determine to request addition of an NR SN to enable the UE to receive data from the NR Network 202 as shown at 266.

At 266, the LTE Network 201 can send an addition request to the NR Network 202 in a manner similar to that described above with reference to 203.

At 269, the NR Network 202 responds to the addition request message with an acknowledgement message in a manner similar to that described above with reference to 206.

At 272, the LTE Network 201 can send an RRC reconfiguration message in a manner similar to that described above with reference to 209, and at 275, the UE 115 can respond in a manner similar to that described above with reference to 212.

At 278 the LTE Network 201 can send a reconfiguration complete message to the NR Network 202 in a manner similar to that described above with reference to 215.

At 281, the UE 115 can perform an RA procedure with the NR Network 202 in manner similar to that described above with reference to 218.

At 284, the UE can communicate with the LTE Network 201 and simultaneously, at 287, also communicate with the NR Network 202 in a manner similar to that described above with reference to 221 and 224.

Figure 3:
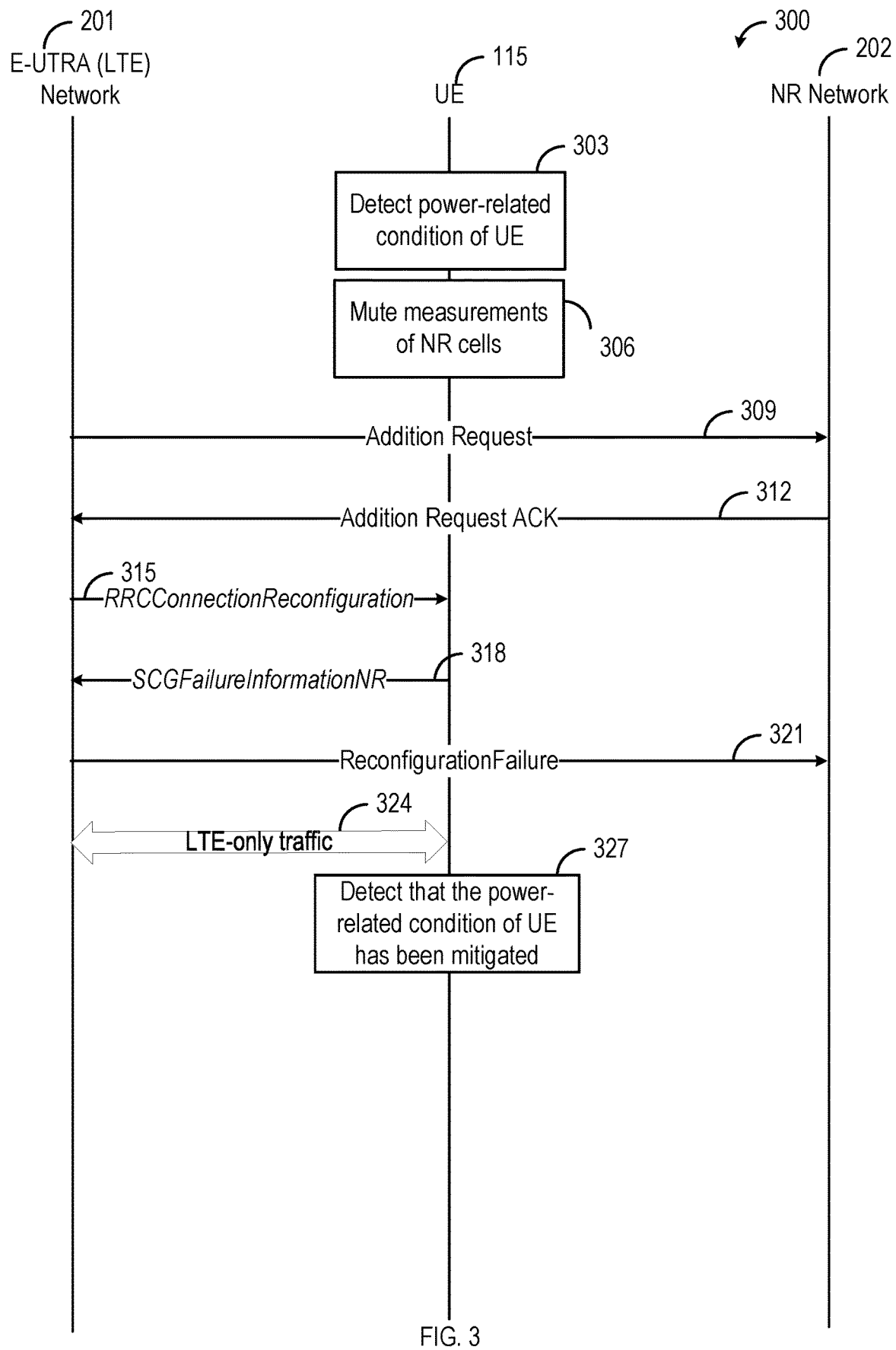
FIG. 3 illustrates a sample flow diagram in which a UE is not in an EN-DC mode and detects a power related-condition before the LTE network attempts to add a secondary node (SN) in an EN-DC scenario.

FIG. 3 illustrates a sample flow diagram in which a UE is not in an EN-DC mode and detects a power related-condition before the LTE network attempts to add a secondary node (SN) in an EN-DC scenario. The example of FIG. 3 is similar to that of FIGS. 2A and 2B, except that in FIG. 3, when the power-related condition of the UE 115 is detected by the UE 115, the UE 115 is not yet in an EN-DC mode and is only connected to the LTE Network.

At 303, the UE 115 detects a power-related condition of the UE 115 in a manner similar to that described with reference to 227 of FIG. 2A. However, since in this example, the UE 115 is not yet connected to the NR Network 202, the UE 115 does not send any message to the LTE Network 201 to indicate to the LTE Network 201 to release the connection of the UE 115 to the NR Network 202.

At 306, the UE 115 mutes measurements of NR cells. As noted with reference to FIGS. 2A and 2B, an RRC configuration or reconfiguration may include an explicit or implicit instruction to the UE 115 to perform measurements of various signals in the UE's 115 environment, including NR signals from NR cells of the NR Network 202. The LTE Network 201 can use reported signal measurements of NR cells from the UE 115 to determine that the UE 115 use resources of the NR Network 202 for communication. However, at 306, the UE 115 mutes measurements of NR cells, and as such, the UE 115 will not report any NR signal measurements to the LTE Network 201. Alternatively, the UE 115 can report artificial NR signal measurements, for example, by reporting data generated by the UE not based on actual measurements.

Based on the muting of the measurements of NR cells of the NR Network 202 by the UE 115 as indicated at 306 (i.e., the UE 115 either not reporting measurements or reporting artificial measurements), generally speaking, the LTE Network 201 will not seek to add an NR SN of the NR Network 202. This is because, without measurements to indicate to the LTE Network 201 that the UE 115 can receive a sufficient quality signal from the NR Network 202, the LTE Network 201 will generally not determine that the UE 115 should connect to the NR Network 202. Additionally or alternatively, in a case where the UE 115 sends artificial measurements to the LTE Network 201, and the UE 115 generates measurement data not based on actual measurements, the UE 115 will generate measurements that indicate that the NR signals at the UE 115 are too weak for the UE 115 to connect to the NR Network 202 in order for the LTE Network 201 to determine not to add an NR SN of the NR Network 202 and in order for the LTE Network 201 not to attempt to cause the UE 115 to connect to the NR Network 202.

However, it may be the case that the LTE Network 201 may still attempt to add an NR SN associated with the NR Network 202 even with no NR signal measurements reported by the UE 115 or with artificial NR signal measurements reported by the UE 115. In such a case, at 309, the LTE Network 201 may still send an addition request to the NR Network 202 in a manner similar to that described above with reference to 203 of FIG. 2A.

At 312, the NR Network 202 may respond with an addition request acknowledgement in a manner similar to that described above with reference to 206.

At 315, the LTE Network 201 can send an RRC reconfiguration message in a manner similar to that described above with reference to 209. However, here, responsive to the detection of the power-related condition of the UE 115 at 303, in response to the RRC reconfiguration message, the UE 115 can respond at 318 with a failure message. In one example, at 318, instead of sending a RRCConnectionReconfigurationComplete message the UE 115 sends a SCGFailureInformationNR message to the LTE Network 201. In one such example, the UE 115 can set a failure type in the message to correspond to a failure type associated with RRC reconfiguration failure, such as, for example, scg-reconfigFailure. In view of the failure message, the UE 115 does not apply any part of the reconfiguration of 315 and continues using the RRC configuration it was using prior to the RRC reconfiguration message of 315.

At 321, the LTE Network 201 may inform the NR Network 202 that the attempt to add the NR SN associated with the NR Network 202 was unsuccessful.

Because the UE 115 rejected the addition of the NR Network 202 as described with reference to 306, 309, 312, 315, 318, and 321, at 324, the UE 115 may communicate with the LTE Network 201 and LTE-only traffic may be communicated between the UE 115 and the LTE Network 201.

At 327, the UE may detect that the power-related condition of the UE 115 has been mitigated. 327 may correspond with 254 with reference to FIG. 2B. Responsive to the detection by the UE 115 that the power-related condition of the UE 115 has been mitigated, the flow 300 may proceed in a manner similar to flow 200 as shown in 257, 260, 263, 266, 269, 272, 275, 278, 281, 284, and 287 with reference to FIG. 2B.

It is understood that the example flows 200 and 300 were given with reference to an LTE MN associated with an LTE Network 201 which adds an NR SN associated with an NR Network 202, however, power management by the UE 115 may be performed where both the MN and the SN are NR nodes (for example, in an NR-NR Dual Connectivity (NR-DC)), in which case, to reduce power consumption, the UE 115 may perform steps similar to those described above in order to have the NR MN not add, or release if already added, the NR SN. The MN and the SN may also operate using other RATs other than LTE or NR, where the RAT of the MN and the RAT of the SN may be the same or different.

Figure 4:
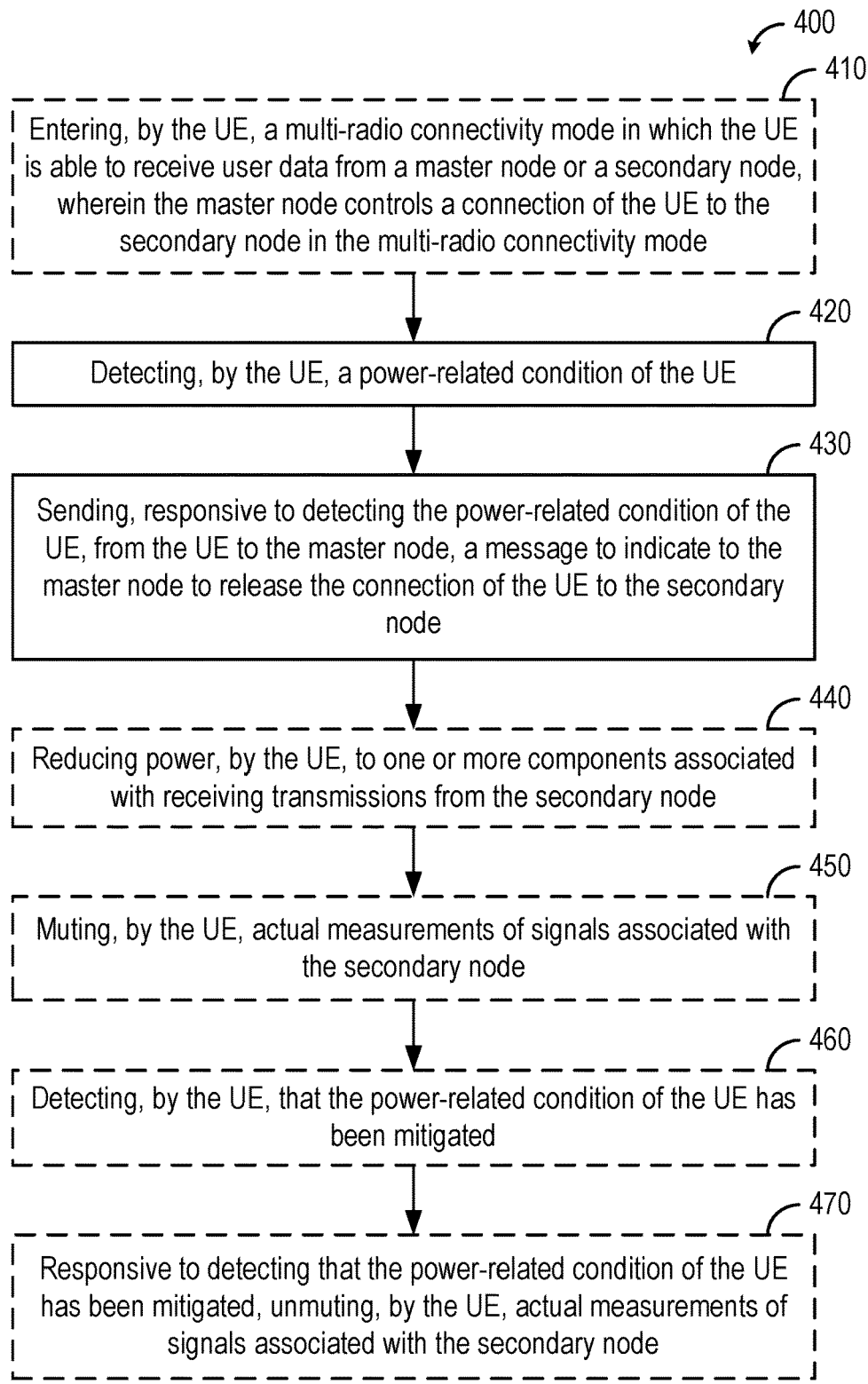
FIG. 4 illustrates an example method for reducing power consumption by a multi-radio connectivity UE.

FIG. 4 illustrates an example method 400 for reducing power consumption by a multi-radio connectivity UE, for example UE 115. Optionally, method 400 begins at block 410 with entering, by the UE (e.g., using processor 620, UE communications manager 615, and/or the like), a multi-radio (MR) connectivity mode in which the UE is able to receive user data from a master node and a secondary node, wherein the master node controls a connection of the UE to the secondary node in the multi-radio connectivity mode. In one example, entering the multi-radio connectivity mode can include aspects similar to those described with reference to 203, 206, 209, 212, 215, 218, 221, and 224 of FIG. 2A. In an example where the UE is in a dual connectivity mode, the data received by the UE from the master node can include control data, for example, over a physical uplink control channel (PUCCH). Furthermore, in the dual connectivity mode, the data received by the UE from the secondary node can include user data, for example, over a physical uplink shared channel (PUSCH). When the dual connectivity mode is an EN-DC mode, since the node associated with the LTE network is the MN, the UE receives no non-scheduling control data from the secondary node associated with the NR network, although, as noted above, control related to scheduling for the secondary node can be received from the secondary node.

When the UE is in a multi-radio connectivity mode, such as an MR-DC mode (such as, for example, an EN-DC mode, an NR-DC mode, or an NE-DC mode), the UE generally consumes greater power than when connected only to one node. This is because the UE, for example, to support the multi-radio connectivity mode, will generally perform measurements on a greater number of reference signals when in a, for example, dual connectivity mode when compared to the number of reference signals when connected to only one node. Additionally or alternatively, when the secondary node or network is from a RAT that is different from the RAT associated with the master node, the UE may power additional hardware components to enable simultaneous multi-RAT connectivity. If connection to one of the radios, for example the secondary radio or node, is released, the UE may conserve power by reducing the power (e.g., reducing power, putting in a sleep mode, powering down completely, etc.) to hardware associated with the secondary radio or node. Means for performing the functionality of block 410 can, but not necessarily, include antenna 640, transceiver 635, bus 610, UE communications manager 615, modem manager 616, modem manager 617, processor 620, and/or memory 625 with reference to FIG. 6.

In view of the power issues discussed above, method 400 continues at block 420 with detecting, by the UE (e.g., using processor 620, UE communications manager 615, and/or the like), a power-related condition of the UE. Detecting the power-related condition of the UE at block 420 can include aspects similar to those described with reference to 227 of FIG. 2A and/or 303 of FIG. 3. As such, the power-related condition of the UE can be detected while the UE is in a multi-radio connectivity mode (in an example where method 400 begins at block 410) or before the UE enters a multi-radio connectivity mode.

Various examples of the power-related condition of the UE can comprise a battery state of charge of a battery of the UE falling below a battery charge threshold, a battery voltage of the battery of the UE falling below a battery voltage threshold, a temperature reading in the UE exceeding a temperature threshold, or any combination thereof.

Figure 6:
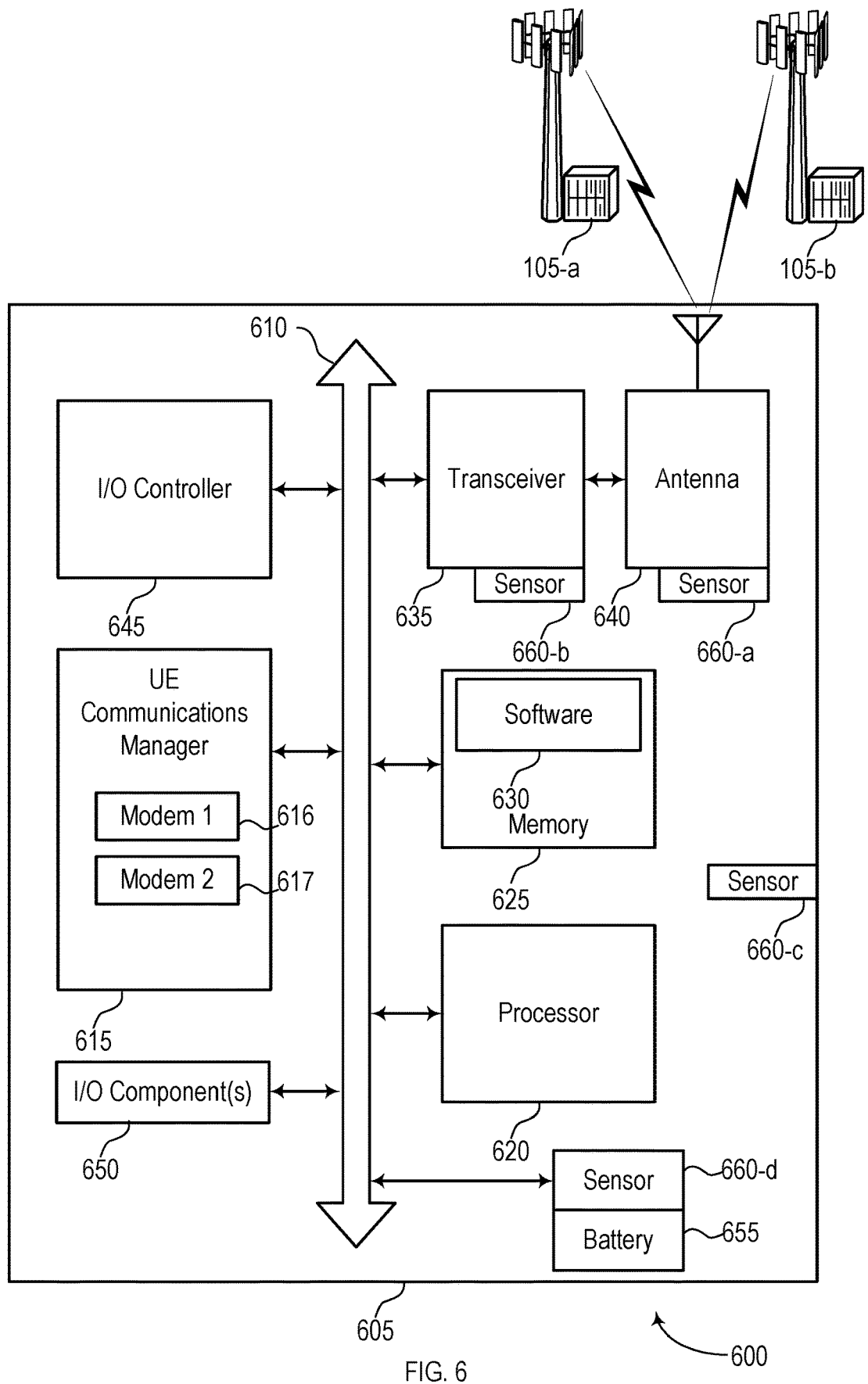
FIG. 6 shows a diagram of a system including a device that supports power savings in a multi-radio connectivity UE in accordance with aspects of the present disclosure.

For example, a processor of the UE (e.g., processor 620, UE communications manager 615) can receive a signal from one or more sensors (e.g., temperature sensors 660-a, 660-b, 660-c, and/or battery sensor 660-d with reference to FIG. 6) indicating a battery state of charge, a battery voltage, or a temperature. The one or more sensors can include, for example, a battery sensor, current sensor, voltage sensor, temperature sensor, and/or the like, or any combination thereof. A sensor can be integrated within a power management integrated circuit (PMIC), integrated with another circuit and/or be a stand-alone sensor.

For example, to extend the time the UE remains powered on when the battery is low, the UE may seek to reduce its power consumption by disconnecting or releasing the connection to one radio of a multi-radio connectivity mode of the UE. Hence, if the processor receives a signal from a battery sensor (e.g., battery sensor 660-d) indicating a battery state of charge at and/or below 10%, 5%, 2%, and/or the like, the UE (e.g., processor 620, UE communications manager 615) may detect a power-related condition of the UE. Such a battery state of charge may roughly correspond to a displayed battery charge indication on a display of a UE, although it is understood that they may not be identical. Additionally or alternatively, the voltage output by the battery may drop below a voltage threshold. For example, where a nominal battery output voltage is typically at 3.8 V or so, if the battery outputs below 3.4 V, 3.3 V, 3.2 V, and/or the like, PMIC or other suitable circuit or sensor may send a signal to the processor to indicate the battery output voltage. Upon receiving the signal, the processor may then compare the measure voltage and, based on the comparison, detect a power-related condition of the UE. It is understood that the battery state of charge and the battery output voltage may be used together to detect the power-related condition of the UE, as there can be a relationship between the battery state of charge and the battery output voltage.

Additionally or alternatively, a processor of the UE (e.g., using processor 620, UE communications manager 615, and/or the like) can receive a signal from one or more temperature sensors (e.g., sensor 660-a, 660-b, and/or 660-c). Such a signal can indicate a temperature, such as a skin temperature or a die or junction temperature. For example, the temperature sensor can be configured to measure a skin temperature of an outer package of the UE (as in temperature sensor 660-c) at one or more locations on the device where power consumption by the UE should be reduced if the skin temperature exceeds a temperature that is safe or comfortable for a user to touch or handle when using the UE. In such an example, the temperature threshold could include relatively low, for example 50° C., 48° C., 45° C., and/or the like. Additionally or alternatively, one or more temperature sensors can be configured to measure a junction temperature or other temperature on the silicon die of one or more circuits of the UE (as in temperature sensors 660-a and/or 660-b), for example a modem, baseband processor, an RF amplifier, an antenna array, a processor, etc., where power consumption by the UE should be reduced if the junction or other temperature exceeds a temperature that may harm the overheating circuit or neighboring circuitry. Temperature thresholds in such cases can include, for example, temperatures at or above 100° C., 105° C., 110° C., and/or the like. The temperature sensor measuring the temperature may then send the signal indicating the measured temperature to a processor of the UE (e.g., using processor 620, UE communications manager 615, and/or the like), which can be configured to, upon receiving the signal indicating the temperature, compare the measured temperature received in the signal to the temperature threshold, and, based on the comparison, detect the power-related condition of the UE.

Means for performing the functionality of block 420 can, but not necessarily, include, for example, bus 610, UE communications manager 615, processor 620, memory 625, temperature sensors 660-a, 660-b, and 660-c, and/or battery sensor 660-d with reference to FIG. 6.

The method 400 continues at block 430 with sending, responsive to detecting the power-related condition of the UE, from the UE (e.g., using processor 620, UE communications manager 615, and/or the like) to the master node, a message to indicate to the master node to release the connection of the UE to the secondary node. In one example, sending the message can include aspects similar to those described with reference to 230, 233, 236, 239, 242, 245, and 248 of FIG. 2A and/or 309, 312, 315, 318, 321, and 324 of FIG. 3. The message to indicate to the master node to release the connection of the UE to the secondary node can include a message indicating a radio link failure (RLF) of the SCG to the master node. For example, the RLF can be a PSCell RLF. Although it is possible that the UE connection to the PSCell of the SCG may not actually be experiencing a RLF, the UE can use a mechanism provided for in the standard for indicating an SCG RLF to the master node in order to disable carriers of the SCG temporarily to conserve power at the UE due to the power-related condition detected in the UE. In one approach, the UE may send signal measurement reports (including artificial measurements) indicating that various frequencies used by the secondary node or SCG are not suitable for maintaining a communications link with the UE. In such a case, the master node or secondary node may continue to search for other carrier frequencies used by the secondary node and requesting the UE to measure such signals, etc., which can waste time and resources of both the network and the UE. Here, however, by reporting an RLF, a single message can indicate to the master node that the secondary node should be released. However, it is understood that other messages or protocols may also be used to indicate to the master node to release the connection of the UE to the secondary node.

One mechanism for indicating the PSCell RLF can include the UE reporting an SCG failure to the master node by sending an RRC message, for example, a SCGFailureInformationNR message. Typically, as defined by communications standards associated with LTE and NR, the SCGFailureInformationNR message can optionally include one or more fields for reporting, by the UE, signal (for example, reference signal) measurements to the network. For example, such measurements can be included in a MeasResultSCG-Failure field, a measResultFreqListNR field, and/or the like, or any combination thereof. In some implementations, the UE may send the SCGFailureInformationNR message or other message without including these optional measurements for signals of the secondary node. Alternatively, the UE may send artificial measurements using these fields. If, after sending the SCGFailureInformationNR message, the UE receives a command from the master node to send measurements for carriers of the secondary node, the UE may send, in lieu of actual measurements, artificial measurements, i.e., data not based on actual measurements. Furthermore, the SCGFailureInformationNR message can include a failure type to indicate a synchronization reconfiguration failure, such as SynchReconfigFailure (for example, scg-ChangeFailure or synchronousReconfigurationFailure-SCG, and/or the like).

If, after sending the SCGFailureInformationNR message or other message and while the power-related condition persists, the master node attempts to add the secondary node, the UE can reject the addition by sending a message. In one example, such a message for rejecting the addition of the secondary node can include the SCGFailureInformationNR message. Here too, as just described above, it is possible for the UE to send no signal measurements for carriers associated with the secondary node, or, if useful to respond to the network, artificial measurements for these carriers.

After sending the message of block 430, the UE may become disconnected from the secondary node after a process similar to 236, 239, 242, 245, and/or 248 with reference to FIG. 2A. Alternatively, in scenarios where the power-related condition of the UE was detected before the secondary node of the SCG was added, the UE may reject the addition request after a process similar to 318, and/or 321 with reference to FIG. 3. Means for performing the functionality of block 430 can, but not necessarily, include antenna 640, transceiver 635, bus 610, UE communications manager 615, modem manager 616, modem manager 617, processor 620, and/or memory 625 with reference to FIG. 6.

Once the UE is disconnected from, or rejects the addition of, the secondary node, the method 400 optionally moves to block 440 with reducing power, by the UE (e.g., using processor 620, UE communications manager 615, and/or the like), to one or more components associated with receiving transmissions from the secondary node. For example, where the master node is associated with one RAT, for example LTE, and the secondary node is associated with a different RAT, for example NR, the UE may reduce power to hardware components or portions thereof that are used in transmitting and/or receiving signals using NR by putting such hardware components or portions thereof into a sleep mode, or even completely powering down such components, without adversely affecting the performance of LTE signal transmission and/or reception. Such components can include modulator-demodulator (modem), radio frequency integrated circuit (RFIC), antenna modules, any combination thereof, and/or the like associated with, in this example, NR. Where the master node and the secondary node are associated with a same RAT, for example where both are associated with NR, the secondary node, for example, may use a different frequency range than a frequency range used by the master node. Therefore, similar to the different RAT scenario, the UE may reduce power to hardware components or portions thereof that are used in transmitting and/or receiving signals using one NR frequency range used by the secondary node (e.g., frequency range 2 (FR2)), while maintaining power for hardware components or portions thereof used in the frequency range used by the master node (e.g., frequency range 1 (FR1)). In such an example, FR1 may be below 4.7 GHz, while FR2 can be greater than about 24 GHz. Means for performing the functionality of block 440 can, but not necessarily, include antenna 640, transceiver 635, bus 610, UE communications manager 615, modem manager 616, modem manager 617, processor 620, and/or memory 625 with reference to FIG. 6.

Method 400 continues at block 450 with muting, by the UE (e.g., using processor 620, UE communications manager 615, and/or the like), actual measurements of signals associated with the secondary node. Muting measurements of signals associated with the secondary node can include aspects similar to those described with reference to 233 of FIG. 2A and/or 306 of FIG. 3. After the UE indicates to the master node to release the connection of the UE to the secondary node, the UE can cease to perform measurements of signals, for example reference signals such as CSI-RS, primary synchronization signal (PSS), secondary synchronization signal (SSS), and/or other reference signals, associated with the secondary node. By not performing these signal measurements, the UE can conserve power in view of the detected power-related condition. When muting actual measurements, the UE ceases reporting signal measurements associated with the secondary node to the master node at all or may report artificial measurements to the master node. Reporting signal measurements can include sending a measurement report for measurements of reference signals such as CSI-RS, PSS, SSS, and/or the like. As such, muting signal measurements can include the UE not sending measurement reports to the master node. In scenarios where the master node requests such measurements, and where it is useful for the UE to comply with such requests, the UE may send artificial measurements for signals associated with the secondary node by generating and sending data not based on actual measurements. It is understood that since the UE does not wish to connect to the secondary node to conserve power, such artificial measurements generated not based on actual measurements would be generated in order to indicate or simulate a bad signaling environment at the UE for signals associated with the secondary node. In this manner, the master node, based on the received artificial measurements, will not request that the UE add the secondary node. Means for performing the functionality of block 450 can, but not necessarily, include antenna 640, transceiver 635, bus 610, UE communications manager 615, modem manager 616, modem manager 617, processor 620, and/or memory 625 with reference to FIG. 6.

The method 400 continues at block 460 with detecting, by the UE (e.g., using processor 620, UE communications manager 615, and/or the like), that the power-related condition of the UE has been mitigated. Detecting that the power-related condition of the UE has been mitigated can include aspects similar to those described with reference to 254 of FIG. 2B and/or 327 of FIG. 3. In a manner similar to that described above with reference to block 420, one or more sensors of the UE may send a signal to the processor 620 of the UE or UE communications manager 615 where the signal is indicative of a voltage, battery charge, or temperature. Once received, the processor can compare the indicated voltage, battery charge, or temperature to the appropriate threshold, and determine, based on the comparison, that the power-related condition of the UE has been mitigated. For example, the signal may indicate that the battery charge state is now above the battery charge threshold, the battery voltage is now above the battery voltage threshold, and/or the temperature is now below the temperature threshold. It is understood that the battery charge threshold, battery voltage threshold, and/or the temperature threshold used to detect the power-related condition may differ from the battery charge threshold, battery voltage threshold, and/or the temperature threshold used to detect that the power-related condition of the UE has been mitigated. For example, if the power-related condition of the UE is detected based on the battery charge being below a threshold of 10% or 5% charge, the UE may be configured to detect that the power-related condition has been mitigated once the charge is greater than, for example, 20% or 15%. Similarly, if the power-related condition of the UE is detected based on a skin temperature exceeding 50° C. or 48° C., the UE may be configured to detect that the power-related condition has been mitigated once the skin temperature is below, for example, 40° C. or 35° C. Means for performing the functionality of block 460 can, but not necessarily, include, for example, bus 610, UE communications manager 615, processor 620, memory 625, temperature sensors 660-a, 660-b, and 660-c, and/or battery sensor 660-d with reference to FIG. 6.

The method 400 continues at block 470 with, responsive to detecting that the power-related condition of the UE has been mitigated, unmuting, by the UE (e.g., using processor 620, UE communications manager 615, and/or the like), actual measurements of signals associated with the secondary node. Unmuting actual measurements after the power-related condition of the UE has been mitigated can include aspects similar to those described with reference to 257, 260, 263, 266, 269, 272, 275, 278, 281, 284, and/or 287 of FIG. 2B. In one aspect, the UE, responsive to detecting that the power-related condition of the UE has been mitigated, may begin measuring signals associated with the secondary node and then reporting these measured signals (using data based on actual measurements). Based on these reported measurements, the master node can determine to add the secondary node when these signal measurements indicate that the UE can maintain a good connection to the secondary node. Such reporting can include the UE reporting reference signal received power (RSRP), received signal strength indicator (RSSI), reference signal received quality (RSRQ), channel quality indicator (CQI), and/or the like for reference signals such as CSI-RS, PSS, SSS, and/or the like. Means for performing the functionality of block 470 can, but not necessarily, include antenna 640, transceiver 635, bus 610, UE communications manager 615, modem manager 616, modem manager 617, processor 620, and/or memory 625 with reference to FIG. 6.

Figure 5:
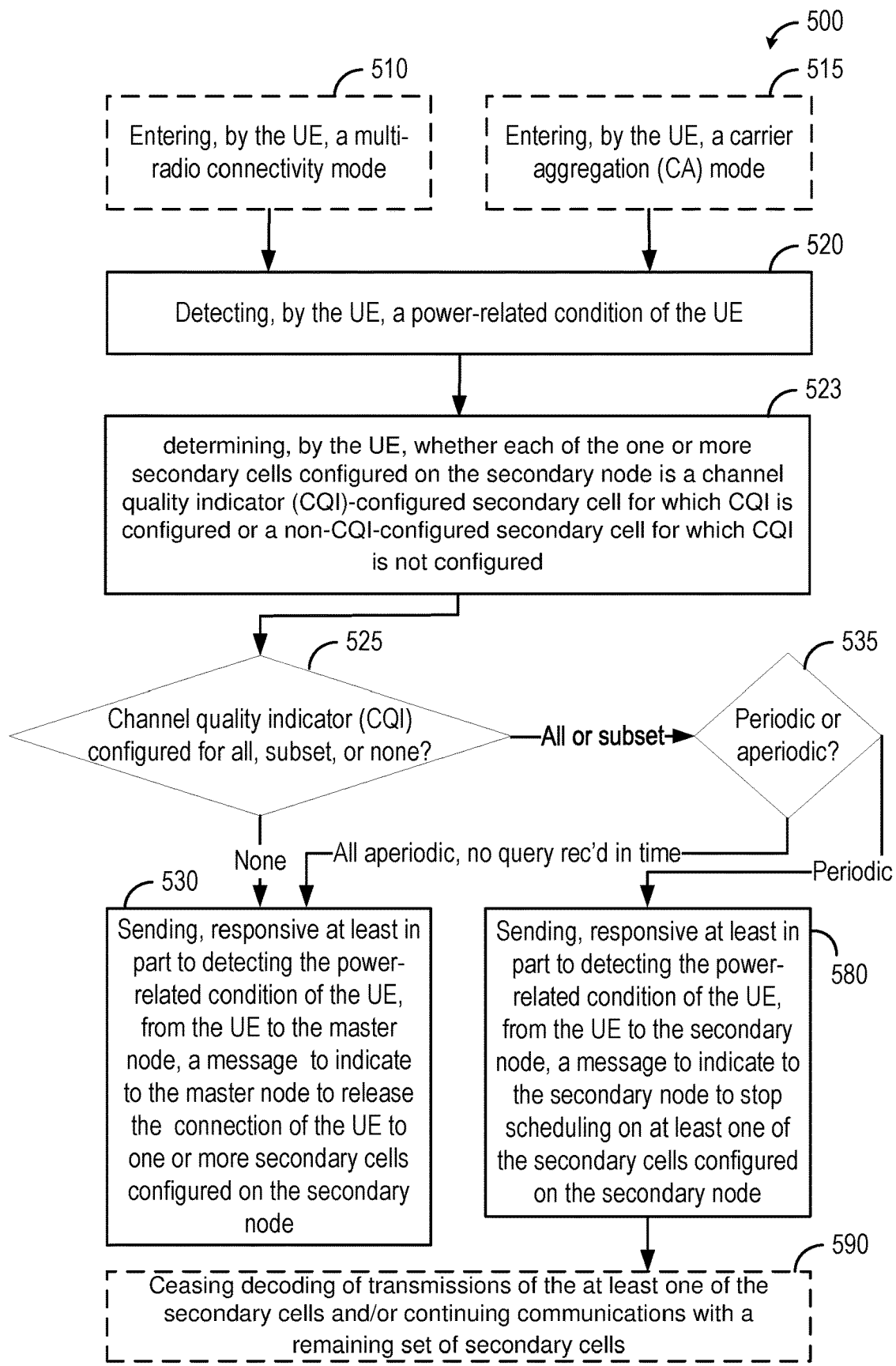
FIG. 5 illustrates an example method for reducing power consumption by a UE.

FIG. 5 illustrates an example method 500 for reducing power consumption by a UE. Optionally, method 500 begins at 510 with entering, by the UE, a multi-radio connectivity mode. Block 510 can, for example, be similar to block 410 discussed above with reference to FIG. 4. Alternatively, method 500 may optionally begin at 515 with entering, by the UE, a carrier aggregation (CA) mode. In one example of a CA mode, the UE can operate in a stand alone (SA) mode having only a single node. The single node in a CA mode can be, in various examples, an LTE node or an NR node. As will be seen later, unlike a multi-radio connectivity mode where there are two (or more) nodes, given that there is a single node in CA, it is not possible to maintain connection with the network through one node, such as the master node, while releasing another node, such as the secondary node. Hence, as described further below, in CA, it is possible to send a message intended to indicate to the network to stop scheduling on one or more secondary cells being used in a CA mode.

Method 500 continues at 520 with detecting, by the UE, a power-related condition of the UE. Block 520 can, for example, be similar to 227 discussed above with reference to FIG. 2A and/or block 420 discussed above with reference to FIG. 4.

Method 500 continues at 523 with determining, by the UE, whether each of the one or more secondary cells configured on the secondary node is a channel quality indicator (CQI)-configured secondary cell for which CQI is configured or a non-CQI-configured secondary cell for which CQI is not configured. As discussed elsewhere herein, in order to mitigate the power-related condition, it may be useful to send an RLF of the SCG to the master node. In such a situation, all secondary cells configured for the secondary node will have their connection released. A similar result, however, can be achieved by, instead of sending an RLF for the secondary node (which would release connection to all secondary cells configured on the secondary node), reporting, by the UE, a low CQI value (e.g., zero (0) value) indicating to the secondary node that the channel quality for a particular secondary cell is very low, even if the channel quality is fine. The secondary node, based on this report, may then reduce or stop scheduling data on the secondary cell for which it received a low CQI value. This mechanism can be useful when CQI has been configured for a given secondary cell. However, not all cells, particularly in NR, may have CQI configured. Hence, at block 523, the UE can determine which secondary cells configured in the secondary node have CQI configured and which secondary cells do not have CQI configured. This can enable the UE to then use CQI as a less drastic method for reducing power consumption without releasing connection to the secondary node entirely. Furthermore, in a scenario where there is a single node, such as in the CA mode, CQI can be used to maintain connection with one or more cells, while reducing or eliminating scheduling from at least one cell to help mitigate the power-related condition. As is understood, even if CQI is configured for some or all cells whether in a CA mode or a multi-radio connectivity mode, if the power-related condition is severe enough, a connection may be released to all secondary cells by messaging an RLF, or even unilaterally ceasing all communication with the network, as discussed elsewhere herein. However, reporting a low CQI can be useful in situations where the power-related condition is not so severe where reducing or eliminating scheduling of data on a given secondary cell or cells may be enough to mitigate the condition without releasing connection to all secondary cells.

The method 500 continues at block 525 where the UE may respond differently in different scenarios based on whether CQI is configured for all secondary cells, a subset of secondary cells, or none of the secondary cells. Hence, at block 525, it may be determined, for each secondary cell, whether such secondary cell is a non-CQI-configured secondary cell or a CQI-configured secondary cell. Typically, a secondary cell is a CQI configured secondary cell when the UE receives an RRC message to configure CQI reporting for the cell. Hence, while block 525 may be illustrated as being after blocks 520 and 523, it is understood that UE may make such determination based on an RRC message received before blocks 520 and 523. The UE may store, for example, whether a given cell is a CQI-configured cell in memory and may then retrieve such stored information later to determine whether none, some, or all secondary cells are CQI-configured cells.

The method 500 continues at block 530 with sending, responsive at least in part to detecting the power-related condition of the UE, a message to indicate to the master node to release the connection of the UE to the secondary node. The sending in block 530 can further be based on a determination in accordance with block 525 that none of the one or more secondary cells are CQI-configured secondary cells. Block 530 can, for example, be similar to block 430 with reference to FIG. 4. Furthermore, as described above with reference to FIG. 4, once the power-related condition of the UE subsides, the UE can send a message to indicate to the master node to re-establish the connection of the UE to the secondary node. As such, although not explicitly shown in FIG. 5, it is understood that the method may further include detecting, by the UE, that the power-related condition has been mitigated and, responsive to detecting that the power-related condition has been mitigated, sending a message to the master node to re-establish the connection of the UE to one or more secondary cells configured on the secondary node and/or sending a message to indicate to the secondary node to resume scheduling on at least one of the secondary cells configured on the secondary node.

Returning to block 525 and proceeding to block 535, if the UE determines that CQI is configured for all secondary cells (that is all secondary cells are CQI-configured secondary cells) or that CQI is configured for a subset of secondary cells (that is a subset of secondary cells are CQI-configured secondary cells), the UE can further determine whether each secondary cell determined to be a CQI-configured secondary cell for which CQI is configured is a periodic CQI-configured secondary cell or an aperiodic CQI-configured secondary cell. For periodic CQI-configured secondary cells, the UE can be configured to report CQI for such cells based on a periodic reporting schedule configured via RRC message. Hence, in such a scenario, the UE periodically reports the CQI for such a cell. As such, where it is determined to be useful to reduce or eliminate scheduling on such a cell, the UE can report a low CQI value (e.g., a value of zero (0)) so that the network or the secondary node can start reducing or eliminate scheduling of data on such cell for which the low CQI value was reported. However, in the case of an aperiodic CQI-configured secondary cell, the UE reports CQI upon receipt of a query from the network or the secondary node. As such, where the cell is an aperiodic CQI-configured secondary cell, the UE may or may not report the low CQI value depending on whether the UE receives a query quickly enough based on how severe the power-related condition is, as discussed further below. Means for performing the functionality of blocks 523, 525, and 535 can, but not necessarily, include, for example, bus 610, UE communications manager 615, processor 620, memory 625, transceiver 635, and antenna 640 with reference to FIG. 6

Moving from block 535, the method 500 continues at block 580 with sending, responsive at least in part to detecting the power-related condition of the UE, from the UE to the secondary node, a message to indicate to the secondary node to stop scheduling on at least one of the secondary cells configured on the node. The sending in block 535 can further be based on a determination according to block 535 that the secondary cell is a periodic CQI-configured secondary cell. In the case of an aperiodic CQI-configured secondary cell, a message may or may not be sent as will be described below. As just discussed, in one example, the message to indicate to the secondary node to stop scheduling can include the UE reporting a low CQI value to the network or the secondary node. In a scenario where the CQI-configured secondary cell is a periodic CQI-configured secondary cell, the UE is aware of the time at which the next CQI should be reported based on the configured reporting schedule. In such a scenario, UE can determine how severe the power-related condition is. If the power-related condition is not so severe as to indicate immediate release of all secondary cells, and the UE can wait until the next reporting time, then the UE can report the low CQI value at least once for each secondary cell determined to be a periodic CQI-configured secondary cell. In a case where the UE determines that it is useful to report low CQI for one or more secondary cells multiple times, for example to give enough time for network to stop scheduling data on those secondary cells, the UE can determine a time window during which to report the low CQI values. The time window can be based, in part, on the periodicity of CQI reporting. Hence, if the UE determines to report CQI two or three times, for example, the time window can be computed to be long enough such that CQI will be reported the desired number of times. The time window can be further based on the severity of the power-related condition and how quickly the UE is to resolve such condition. During this time window, the UE reports CQI and can continue to decode downlink control information (DCI) and data for which a low CQI value is being reported, but sends HARQ NACKs even though they have been properly decoded to further indicate to the network to stop scheduling on said cells. After the time window, the UE expects no further scheduling from the network, and stops decoding DCI and data (as described with reference to block 590 below), thereby saving power.

Furthermore, some scenarios include cross-carrier reporting where CQI for a given secondary cell maybe reported to another cell. For the secondary cells for which the UE reported low CQI, after scheduling has stopped on such cells, the UE can continue to report low CQI for such cells in any cross-carrier reporting. It is understood also that when reporting a low CQI for a given secondary cell, both the wideband and sub-band CQI will be reported as having a low CQI (e.g., CQI value of zero (0)).

In a scenario where the CQI-configured secondary cells are aperiodic CQI-configured secondary cells, the UE may or may not report a low CQI value based on whether a query for a CQI report was received for the given secondary cell within the time window. As described above, in some situations, the time window can be based, in part, on the periodicity of a periodic CQI-configured cell. In an aperiodic scenario, the time window can be determined by the UE based on, for example, the periodicity of another secondary cell, for example, another secondary cell for which the UE also intends to report low CQI. Additionally, as described above, the time window can also be based on the power-related condition and its severity. When the power-related condition need not be mitigated immediately, the UE can determine a time window during which the UE can report low CQI for periodic CQI-configured secondary cells and can wait for a query from the network for aperiodic CQI-configured secondary cells. Hence, returning to block 535, in a scenario where some or all CQI-configured secondary cells are aperiodic, the method 500 moves to block 580 if at least one, and preferably several, queries are sent from the network to the UE requesting a CQI report and the UE responds to said queries. In such a scenario, the UE will report a low CQI value for one or more aperiodic CQI-configured secondary cells responsive to a query from the network to report CQI for the one or more aperiodic CQI-configured secondary cells received during a time window determined by the UE, as described above.

With continued reference to block 580 and reporting a low CQI value for secondary cells in order to mitigate a power-related condition, it can be noted that network behavior in response to a reported CQI value of zero (0) may be, in some circumstances, unpredictable. Hence, before and independent of any power-related condition, the UE may test network behavior by reporting a CQI value of zero (0) to discover the network's behavior. For example, if, after the UE reports low CQI values, for example a CQI value of zero (0), the network does not stop scheduling, such information can be used by the UE to determine how the UE responds to an actual power-related condition of the UE. In such a situation, the UE may simply move to block 530 and not 580 even when some or all of the secondary cells are CQI-configured secondary cells. Additionally or alternatively, if the UE determines that the network takes a certain amount of time before ceasing to schedule transmissions on the secondary cells reported as having low CQI, such information can be used by the UE to determine the time window during which to report CQI and/or the number of times that the UE should report low CQI before the node ceases to schedule the secondary cell. Such information can also be used by the UE to determine if there is enough time for CQI reporting given the severity of any given power-related condition and how quickly the power-related condition should be mitigated.

Method 500 continues, optionally, at block 590 with ceasing decoding of transmissions of secondary cells of the at least one of the secondary cells configured on the node. In an example where, at block 525, it is determined that a subset of secondary cells configured in the secondary node are CQI-configured cells and for such CQI-configured cells a low CQI value is reported, the UE expects the network to cease scheduling DCI and/or data on such cells, and hence UE saves power by ceasing to decode DCI and/or data for such cells thereby mitigating the power-related condition. Additionally or alternatively, at block 590, the method 500 comprises continuing communications with a remaining set of secondary cells. When it is determined at block 525 that only a subset of secondary cells are configured for CQI, that is that only a subset of cells are CQI-configured secondary cells, the UE can report CQI for such cells as described above. For a remaining set of the one or more secondary cells configured on the secondary node, those which either were not CQI-configured secondary cells or were CQI-configured secondary cells but for which no low CQI value was reported, the UE continues communications.

Means for performing the functionality of blocks 580 and 590 can, but not necessarily, include antenna 640, transceiver 635, bus 610, UE communications manager 615, modem manager 616 and/or modem manager 617, processor 620, and/or memory 625 with reference to FIG. 6.

In view of the discussion above, it is understood that, in a multi-radio connectivity mode, the UE may determine that the power-related condition is too severe and hence may seek to release all secondary cells configured in the secondary node. Furthermore, it is understood that the UE may alternatively determine that the power-related condition can be mitigated by only ceasing to decode all or some of the secondary cells configured on the secondary node without releasing the connection to all secondary cells. In such a situation, the UE may determine which of the one or more secondary cells to cease decoding. To determine which secondary cells to cease decoding, the UE may select secondary cells having lower throughput than other secondary cells. If these selected cells are CQI-configured secondary cells, and if the UE is able to report a low CQI value at least once for these cells as described above, then the UE can cease decoding on these cells thereby conserving power. This can continue until the power-related condition is mitigated, and the UE may then report improved CQI values, for example, either through the previously low CQI reported secondary cell(s) or by cross-carrier reporting and the network may soon thereafter begin scheduling on the secondary cell(s) again.

Returning once more to block 515, in some scenarios of method 500, the UE may be in a CA mode instead of a multi-radio connectivity mode. In such a scenario, it is understood that when in a CA mode, the UE is connected to a single node (instead of a master and secondary node) and that the (single) node comprises a primary cell and one or more secondary cells. Hence, in block 523, in a CA scenario, the single node determines whether each of the one or more secondary cells configured in the node is a CQI-configured secondary node or a non-CQI-configured secondary cell instead of the secondary node making the determination. CQI reporting can then proceed as described above for CQI-configured secondary cells. Furthermore, with reference to block 530, in a CA mode, if none of the secondary cells are CQI-configured secondary cells, then instead of sending a message, in one implementation, the UE may simply instead cease communications with the network without sending any message to the network. Additionally or alternatively, the UE can simply cease communications with the network without any message to the network after the UE determines that a number of CQI-enabled secondary cells is not sufficient to mitigate the power-related condition.

The UE thereby conserves power to mitigate the power-related condition, and the network, without receiving a message from the UE may assume that the UE is out of service or having a radio link failure. In any case, the UE can then seek to re-establish connection with the network after the power-related condition has been mitigated.

FIG. 6 shows a diagram of a system 600 including a device 605 that supports power savings in a multi-connectivity UE in accordance with aspects of the present disclosure. Device 605 may be an example of or include the components of UE 115 as described above, e.g., with reference to FIGS. 1 through 4. Device 605 may include components for bi-directional voice and data communications including components for transmitting and receiving communications, including UE communications manager 615, processor 620, memory 625, software 630, transceiver 635, antenna 640, I/O controller 645, and I/O component(s) 650. These components may be in communication (e.g., electronic communication), or coupled, via one or more buses (e.g., bus 610). To power the other components, device 605 may include a battery 655. Additionally, device 605 may include temperature sensors 660-a and 660-b to measure the temperature of components that may become too hot when consuming power, such as transceiver 635 (which may include, for example, a baseband processor and/or modem) or antenna 640 as examples. Furthermore, device 605 may include a temperature sensor at other locations, such as on an outer package as in temperature sensor 660-c to measure a skin temperature. Although sensors 660-a, 660-b, and 660-c are shown without an indication of a connection to the bus 610 for ease of illustration, it is understood that the sensors can be connected to the bus 610 or otherwise connected to processor 620 and/or UE communications manager 615. Device 605 may communicate wirelessly with one or more base stations, for example base station 105-a and 105-b (as described above, for example, with reference to FIG. 1B).

UE communications manager 615 of FIG. 6 may include a modem manager 616 associated with a master node and a modem manager 617 associated with a secondary node. In scenarios where the MN and SN operate using different RATs, modem manager 616 can, for example, be associated with a first RAT, such as LTE, while modem manager 617 can, for example, be associated with a second RAT, such as NR. Additionally or alternatively, a single modem manager 616 or 617 may be associated with a single node operating in a CA mode, where the node may be an LTE or NR node.

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 620 may be configured to operate a memory array using a memory controller. In other cases, a memory controller may be integrated into processor 620. Processor 620 may be configured to execute computer-readable instructions stored in a memory to perform various functions (e.g., functions or tasks supporting power savings in a multi-connectivity UE). Information such as operating system (OS) information, application statistics, application throughputs, temperatures, battery charge or voltage status may be inter-communicated between various parts of device 605 via bus 610 and the inter-communication may incorporate an interface such as a modem to application processor interface. As discussed above, the processor 620 is in communication with the sensor(s) 660, transceiver 635, and the memory 625 via bus 610. It is understood that when performing various aspects of FIGS. 2A, 2B, 3, 4, and 5, the processor 620 may use the sensor(s) 660, transceiver 635, and/or the memory 625 in performing the various functions. For example, when detecting a power-related condition of the UE, the processor 620 may perform such detection via, or receive signals from, the sensor(s) 660. Additionally when sending, transmitting, or receiving data or messages to or from the network, the processor 620 may perform such sending, transmitting, or receiving via the transceiver 635. Also, when performing various functions, the processor 620 may be executing instructions stored in the memory 625 instructing the processor to perform the various functions.

Memory 625 may include random access memory (RAM) and read only memory (ROM). The memory 625 may be a non-transitory computer-readable medium storing store computer-readable, computer-executable code or software 630 including instructions that, when executed, instruct a processor (e.g., processor 620, UE communications manager 615) to perform various functions described herein, for example, as described in FIGS. 2A, 2B, 3, and/or 4. In some cases, the memory 625 may contain, among other things, a basic input/output system (BIOS) which may control basic hardware or software operation such as the interaction with peripheral components or devices.

Software 630 may include code to implement aspects of the present disclosure, including code to support power savings in a multi-connectivity UE. Software 630 may be stored in a non-transitory computer-readable medium such as system memory or other memory. In some cases, the software 630 may not be directly executable by a processor but may instruct a computer (e.g., when compiled and executed) to perform functions described herein, for example, as described in FIGS. 2A, 2B, 3, and/or 4.

Transceiver 635 may communicate bi-directionally, via one or more antennas, wired, or wireless links as described above. For example, the transceiver 635 may represent a wireless transceiver and may communicate bi-directionally with another wireless transceiver. The transceiver 635 may also include a modem to modulate the packets and provide the modulated packets to the antennas for transmission, and to demodulate packets from signals received from the antennas. In one example, transceiver 635 may include multiple modems (separate or integrated) associated with multiple RATs. For example, transceiver 635 may include at least a 5G/NR modem and a 4G/LTE modem, although it is understood that, in other implementations, a single modem may perform modulation/demodulation for both 5G and 4G. In such a single modem implementation, it is understood that it may be possible to reduce power or power down certain subcomponents of the single modem in a manner similar to that discussed with reference to block 440 with reference to FIG. 4.

In some cases, the wireless device may include a single antenna 640. However, in some cases the device may have more than one antenna 640, which may be capable of concurrently transmitting or receiving multiple wireless transmissions. Additionally or alternatively, antenna(s) 640 can include one or more antenna arrays, where each antenna array comprises a plurality of antenna elements.

I/O controller 645 may manage input and output signals for device 605. I/O controller 645 may also manage peripherals not integrated into device 605. In some cases, I/O controller 645 may represent a physical connection or port to an external peripheral. In some cases, I/O controller 645 may utilize an operating system such as iOS®, ANDROID®, MS-DOS®, MS-WINDOWS®, OS/2®, UNIX®, LINUX®, or another known operating system. In other cases, I/O controller 645 may represent or interact with a modem, a keyboard, a mouse, a touchscreen, or a similar device. In some cases, I/O controller 645 may be implemented as part of a processor. In some cases, a user may interact with device 605 via I/O controller 645 or via hardware components controlled by I/O controller 645.

I/O component(s) 650 may include various components and/or parts that enable interaction with device 605. For example, I/O components(s) may include a screen, touchscreen, speaker, microphone, keyboard or other I/O device.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method for reducing power consumption by a user equipment (UE), the method comprising:
   entering, by the UE, a multi-radio connectivity mode in which the UE is able to receive user data from a master node or a secondary node, wherein the master node controls a connection of the UE to the secondary node in the multi-radio connectivity mode and the secondary node comprises one or more secondary cells;
   determining, by the UE, whether each of the one or more secondary cells configured on the secondary node is a channel quality indicator (CQI)-configured secondary cell for which CQI is configured;
   detecting, by the UE, a power-related condition of the UE; and
   sending, responsive at least in part to detecting the power-related condition of the UE,
      from the UE to the master node, a message to indicate to the master node to release the connection of the UE to the secondary node, wherein sending the message to indicate to the master node to release the connection of the UE to the secondary node is further based on a determination that none of the one or more secondary cells configured on the secondary node are CQI-configured secondary cells, or
      from the UE to the secondary node, a message to indicate to the secondary node to stop scheduling on at least one of the secondary cells configured on the secondary node.

2. The method of claim 1, further comprising:
   reducing power, by the UE, to one or more components associated with receiving transmissions from the secondary node.

3. The method of claim 1, further comprising:
   responsive to detecting the power-related condition of the UE, muting, by the UE, actual measurements of signals associated with the secondary node.

4. The method of claim 1, wherein
   the multi-radio connectivity mode is an Evolved Universal Terrestrial Radio Access (E-UTRA)-New Radio (NR) Dual Connectivity (EN-DC) mode, the master node is associated with a E-UTRA network, and the secondary node is associated with an NR network, and
   the message to indicate to the E-UTRA network to release the connection of the UE to the NR network is an SCGFailurelnformationNR message.

5. The method of claim 4, wherein sending the SCGFailurelnformationNR message comprises including in the SCGFailurelnformationNR message a failure type to indicate a synchronization reconfiguration failure.

6. The method of claim 4, wherein sending the SCGFailurelnformationNR message comprises:
   sending the SCGFailurelnformationNR message without a measResultFreqListNR field;
   or
   sending the SCGFailurelnformationNR message with a measResultFreqListNR field, the measResultFreqListNR field containing data generated by the UE not based on actual measurements.

7. The method of claim 1, further comprising:
   detecting, by the UE, that the power-related condition of the UE has been mitigated; and
   responsive to detecting that the power-related condition of the UE has been mitigated, unmuting, by the UE, actual measurements of signals associated with the secondary node.

8. The method of claim 1, wherein the power-related condition of the UE comprises:
   a battery state of charge of a battery of the UE falling below a battery charge threshold;
   a battery voltage of the battery of the UE falling below a battery voltage threshold;
   a temperature reading in the UE exceeding a temperature threshold; or
   any combination thereof.

9. A method for reducing power consumption by a user equipment (UE), the method comprising:
   entering, by the UE, a multi-radio connectivity mode in which the UE is able to receive user data from a master node or a secondary node, wherein the master node controls a connection of the UE to the secondary node in the multi-radio connectivity mode and the secondary node comprises one or more secondary cells;
   determining, by the UE, whether each of the one or more secondary cells configured on the secondary node is a channel quality indicator (CQI)-configured secondary cell for which CQI is configured;
   determining, by the UE, for each secondary cell determined to be a COI-configured secondary cell for which CQI is configured, whether the CQI-configured secondary cell is a periodic COI-configured secondary cell or an aperiodic COI-configured secondary cell;
   detecting, by the UE, a power-related condition of the UE; and
   sending, responsive at least in part to detecting the power-related condition of the UE,
      from the UE to the master node, a message to indicate to the master node to release the connection of the UE to the secondary node, or
      from the UE to the secondary node, a message to indicate to the secondary node to stop scheduling on at least one of the secondary cells configured on the secondary node, claim wherein the sending the message to indicate to the secondary node to stop scheduling on at least one of the secondary cells configured on the secondary node comprises reporting a CQI value of zero (0) at least once for each secondary cell determined to be a periodic CQI-configured secondary cell.

10. The method of claim 9, wherein the reporting the CQI value of zero (0) at least once for each secondary cell determined to be a periodic CQI-configured secondary cell comprises reporting the CQI value during a time window determined by the UE.

11. The method of claim 9, further comprising:
ceasing decoding, by the UE, of transmissions of secondary cells in a subset of the one or more secondary cells configured on the secondary node determined by the UE to be periodic CQI-configured secondary cells; and
continuing, by the UE, communications with a remaining set of the one or more secondary cells configured on the secondary node for which no CQI value of zero (0) is reported.

12. The method of claim 9, wherein
the multi-radio connectivity mode is an Evolved Universal Terrestrial Radio Access (E-UTRA)-New Radio (NR) Dual Connectivity (EN-DC) mode, the master node is associated with a E-UTRA network, and the secondary node is associated with an NR network, and
the message to indicate to the E-UTRA network to release the connection of the UE to the NR network is an SCGFailureInformationNR message, wherein sending the SCGFailureInformationNR message comprises:
sending the SCGFailureInformationNR message with a failure type to indicate a synchronization reconfiguration failure;
sending the SCGFailureInformationNR message without a measResultFreqListNR field; or
sending the SCGFailureInformationNR message with a measResultFreqListNR field, the measResultFreqListNR field containing data generated by the UE not based on actual measurements.

13. The method of claim 9, wherein the power-related condition of the UE comprises:
a battery state of charge of a battery of the UE falling below a battery charge threshold;
a battery voltage of the battery of the UE falling below a battery voltage threshold;
a temperature reading in the UE exceeding a temperature threshold; or
any combination thereof.

14. A method for reducing power consumption by a user equipment (UE), the method comprising:
entering, by the UE, a multi-radio connectivity mode in which the UE is able to receive user data from a master node or a secondary node, wherein the master node controls a connection of the UE to the secondary node in the multi-radio connectivity mode and the secondary node comprises one or more secondary cells;
determining, by the UE, whether each of the one or more secondary cells configured on the secondary node is a channel quality indicator (CQI)-configured secondary cell for which CQI is configured;
determining, by the UE, for each secondary cell determined to be a CQI-configured secondary cell for which CQI is configured, whether the COI-configured secondary cell is a periodic COI-configured secondary cell or an aperiodic COI-configured secondary cell;
detecting, by the UE, a power-related condition of the UE; and sending, responsive at least in part to detecting the power-related condition of the UE,
from the UE to the master node, a message to indicate to the master node to release the connection of the UE to the secondary node, or
from the UE to the secondary node, a message to indicate to the secondary node to stop scheduling on at least one of the secondary cells configured on the secondary node, wherein the sending the message to indicate to the secondary node to stop scheduling on at least one of the secondary cells configured on the secondary node comprises reporting, by the UE, a CQI value of zero (0) for one or more aperiodic CQI-configured secondary cells responsive to a query from the network to report CQI for the one or more aperiodic CQI-configured secondary cells received during a time window determined by the UE.

15. The method of claim 14, wherein
the multi-radio connectivity mode is an Evolved Universal Terrestrial Radio Access (E-UTRA)-New Radio (NR) Dual Connectivity (EN-DC) mode, the master node is associated with a E-UTRA network, and the secondary node is associated with an NR network, and
the message to indicate to the E-UTRA network to release the connection of the UE to the NR network is an SCGFailureInformationNR message, wherein sending the SCGFailureInformationNR message comprises:
sending the SCGFailureInformationNR message with a failure type to indicate a synchronization reconfiguration failure;
sending the SCGFailureInformationNR message without a measResultFreqListNR field; or
sending the SCGFailureInformationNR message with a measResultFreqListNR field, the measResultFreqListNR field containing data generated by the UE not based on actual measurements.

16. The method of claim 14, wherein the power-related condition of the UE comprises:
a battery state of charge of a battery of the UE falling below a battery charge threshold;
a battery voltage of the battery of the UE falling below a battery voltage threshold;
a temperature reading in the UE exceeding a temperature threshold; or
any combination thereof.

17. A method for reducing power consumption by a user equipment (UE), the method comprising:
entering, by the UE, a multi-radio connectivity mode in which the UE is able to receive user data from a master node or a secondary node, wherein the master node controls a connection of the UE to the secondary node in the multi-radio connectivity mode and the secondary node comprises one or more secondary cells;
determining, by the UE, whether each of the one or more secondary cells configured on the secondary node is a channel quality indicator (COI)-configured secondary cell for which CQI is configured;
detecting, by the UE, a power-related condition of the UE;
determining, by the UE, that the power-related condition can be mitigated by ceasing decoding for only some secondary cells;
determining, by the UE, which of the one or more secondary cells to cease decoding by selecting secondary cells having lower throughput than other secondary cells; and sending, responsive at least in part to detecting the power-related condition of the UE,
from the UE to the master node, a message to indicate to the master node to release the connection of the UE to the secondary node, or
from the UE to the secondary node, a message to indicate to the secondary node to stop scheduling on at least one of the secondary cells configured on the secondary node.

18. The method of claim 17, wherein
the multi-radio connectivity mode is an Evolved Universal Terrestrial Radio Access (E-UTRA)-New Radio (NR) Dual Connectivity (EN-DC) mode, the master node is associated with a E-UTRA network, and the secondary node is associated with an NR network, and
the message to indicate to the E-UTRA network to release the connection of the UE to the NR network is an SCGFailurelnformationNR message, wherein sending the SCGFailurelnformationNR message comprises:
sending the SCGFailurelnformationNR message with a failure type to indicate a synchronization reconfiguration failure;
sending the SCGFailurelnformationNR message without a measResultFreqListNR field; or
sending the SCGFailurelnformationNR message with a measResultFreqListNR field, the measResultFreqListNR field containing data generated by the UE not based on actual measurements.

19. The method of claim 17, wherein the power-related condition of the UE comprises:
a battery state of charge of a battery of the UE falling below a battery charge threshold;
a battery voltage of the battery of the UE falling below a battery voltage threshold;
a temperature reading in the UE exceeding a temperature threshold; or
any combination thereof.

20. A user equipment (UE) comprising:
a sensor;
a transceiver;
a memory; and
a processor in communication with the sensor, the transceiver, and the memory, the processor configured to:
enter a multi-radio connectivity mode in which the UE is able to receive user data from a master node or a secondary node, wherein the master node controls the multi-radio connectivity mode and the secondary node comprises one or more secondary cells;
receive, from the sensor, a signal indicating a power-related condition of the UE;
determine whether each of the one or more secondary cells configured on the secondary node is a channel quality indicator (CQI)-configured secondary cell for which CQI is configured; and
send, responsive at least in part to receiving the signal indicating the power-related condition of the UE,
to the master node via the transceiver, a message to indicate to the master node to release the connection of the UE to the secondary node, the processor further configured to send the message to indicate to the master node to release the connection of the UE to the secondary node further responsive to a determination that none of the one or more secondary cells configured on the secondary node are CQI-configured secondary cells, or
to the secondary node via the transceiver, a message to indicate to the secondary node to stop scheduling on at least one of the secondary cells configured on the secondary node.

21. The UE of claim 20, wherein
the sensor is a battery charge sensor and the signal indicating the power-related condition of the UE indicates a battery state of charge of a battery of the UE falling below a battery charge threshold,
the sensor is a battery voltage sensor and the signal indicating the power-related condition of the UE indicates a battery voltage of the battery of the UE falling below a battery voltage threshold, or
the sensor is a temperature sensor and the signal indicating the power-related condition of the UE indicates a temperature reading in the UE exceeding a temperature threshold.

22. The UE of claim 20, the processor further configured to:
detect that the power-related condition of the UE has been mitigated; and
responsive to detecting that the power-related condition of the UE has been mitigated, unmute actual measurements of signals associated with the secondary node.

23. The UE of claim 20, the processor further configured to:
determine, by the UE, for each secondary cell determined to be a CQI-configured secondary cell for which CQI is configured, whether the CQI-configured secondary cell is a periodic CQI-configured secondary cell or an aperiodic CQI-configured secondary cell.

24. The UE of claim 23, the processor further configured to:
cease decoding of transmissions of secondary cells in a subset of the one or more secondary cells configured on the secondary node determined by the UE to be periodic CQI-configured secondary cells; and
continuing, by the UE, communications with a remaining set of the one or more secondary cells configured on the secondary node for which no CQI value of zero (0) is reported.

25. The UE of claim 20, the processor further configured to:
reduce power to one or more components associated with receiving transmissions from the secondary node.

26. The UE of claim 20, the processor further configured to:
detect that the power-related condition of the UE has been mitigated; and
responsive to detecting that the power-related condition of the UE has been mitigated, unmute actual measurements of signals associated with the secondary node.

27. A user equipment (UE) comprising:
a sensor;
a transceiver;
a memory; and
a processor in communication with the sensor, the transceiver, and the memory, the processor configured to:
enter a multi-radio connectivity mode in which the UE is able to receive user data from a master node or a secondary node, wherein the master node controls a connection of the UE to the secondary node in the multi-radio connectivity mode and the secondary node comprises one or more secondary cells;
determine whether each of the one or more secondary cells configured on the secondary node is a channel quality indicator (CQI)-configured secondary cell for which CQI is configured;

determine, for each secondary cell determined to be a CQI-configured secondary cell for which CQI is configured, whether the CQI-configured secondary cell is a periodic CQI-configured secondary cell or an aperiodic CQI-configured secondary cell;

receive, from the sensor, a signal indicating a power-related condition of the UE;

and send, responsive at least in part to receiving the signal indicating the power-related condition of the UE,
- to the master node via the transceiver, a message to indicate to the master node to release the connection of the UE to the secondary node, or
- to the secondary node via the transceiver, a message to indicate to the secondary node to stop scheduling on at least one of the secondary cells configured on the secondary node, wherein the processor configured to send the message to indicate to the secondary node to stop scheduling on at least one of the secondary cells configured on the secondary node comprises the processor configured to report a CQI value of zero (0) at least once for each secondary cell determined to be a periodic CQI-configured secondary cell.

28. A user equipment (UE) comprising:

a sensor;

a transceiver;

a memory; and a processor in communication with the sensor, the transceiver, and the memory, the processor configured to:

enter a multi-radio connectivity mode in which the UE is able to receive user data from a master node or a secondary node, wherein the master node controls the multi-radio connectivity mode and the secondary node comprises one or more secondary cells;

determine whether each of the one or more secondary cells configured on the secondary node is a channel quality indicator (CQI)-configured secondary cell for which CQI is configured;

determine for each secondary cell determined to be a CQI-configured secondary cell for which CQI is configured, whether the CQI-configured secondary cell is a periodic CQI-configured secondary cell or an aperiodic CQI-configured secondary cell;

receive, from the sensor, a signal indicating a power-related condition of the UE;

and send, responsive at least in part to receiving the signal indicating the power-related condition of the UE,
- to the master node via the transceiver, a message to indicate to the master node to release the connection of the UE to the secondary node, or
- to the secondary node via the transceiver, a message to indicate to the secondary node to stop scheduling on at least one of the secondary cells configured on the secondary node, wherein the processor configured to send the message to indicate to the secondary node to stop scheduling on at least one of the secondary cells configured on the secondary node comprises the processor configured to report a CQI value of zero (0) for one or more aperiodic CQI-configured secondary cells responsive to a query from the network to report CQI for the one or more aperiodic CQI-configured secondary cells received during a time window determined by the UE.

29. A user equipment (UE) comprising:

a sensor;

a transceiver;

a memory; and a processor in communication with the sensor, the transceiver, and the memory, the processor configured to:

enter a multi-radio connectivity mode in which the UE is able to receive user data from a master node or a secondary node, wherein the master node controls the multi-radio connectivity mode and the secondary node comprises one or more secondary cells;

determine whether each of the one or more secondary cells configured on the secondary node is a channel quality indicator (CQI)-configured secondary cell for which CQI is configured;

receive, from the sensor, a signal indicating a power-related condition of the UE;

determine that the power-related condition can be mitigated by ceasing decoding for only some secondary cells;

determine which of the one or more secondary cells to cease decoding by selecting secondary cells having lower throughput than other secondary cells; and send, responsive at least in part to receiving the signal indicating the power-related condition of the UE,
- to the master node via the transceiver, a message to indicate to the master node to release the connection of the UE to the secondary node, or
- to the secondary node via the transceiver, a message to indicate to the secondary node to stop scheduling on at least one of the secondary cells configured on the secondary node.

* * * * *